United States Patent
Kozaki

(10) Patent No.: US 9,816,514 B2
(45) Date of Patent: Nov. 14, 2017

(54) MAGNETIC BEARING DEVICE AND VACUUM PUMP

(71) Applicant: Shimadzu Corporation, Kyoto (JP)

(72) Inventor: Junichiro Kozaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 15/424,039

(22) Filed: Feb. 3, 2017

(65) Prior Publication Data

US 2017/0146016 A1    May 25, 2017

Related U.S. Application Data

(62) Division of application No. 14/448,279, filed on Jul. 31, 2014, now Pat. No. 9,657,774.

(30) Foreign Application Priority Data

Aug. 14, 2013  (JP) .................................. 2013-168546

(51) Int. Cl.
*F04D 19/04* (2006.01)
*F04D 29/058* (2006.01)
(Continued)

(52) U.S. Cl.
CPC ......... *F04D 19/048* (2013.01); *F04D 27/001* (2013.01); *F16C 32/0446* (2013.01)

(58) Field of Classification Search
CPC ...... F04D 19/04; F04D 19/042; F04D 19/048; F04D 29/058; F16C 2360/45;
(Continued)

(56) References Cited

U.S. PATENT DOCUMENTS 6,515,388 B1   2/2003   Moriyama et al.
7,355,833 B2   4/2008   Kozaki
(Continued)

FOREIGN PATENT DOCUMENTS

JP   2000-060169   2/2000
JP   2001-177919   6/2001
JP   2006-308074   11/2006

OTHER PUBLICATIONS

Co-pending U.S. Appl. No. 14/448,279, filed Jul. 31, 2014 (application provided).

*Primary Examiner* — Peter J Bertheaud
(74) *Attorney, Agent, or Firm* — Renner Otto Boisselle & Sklar, LLP

(57) ABSTRACT

A magnetic bearing device includes first and second radial electromagnets supporting a rotor shaft in a contactless manner in first and second radial directions. A controller controls each of a first excitation amplifier and a second excitation amplifier based on a result of demodulation by each of a first demodulation section and a second demodulation section. The phase of a second carrier signal differs by ($\pi/2+\theta$) radian from the phase of a first carrier signal. A first demodulation section samples a detection signal of a first current sensor at sampling timing shifted by a phase $\theta$ from timing at which a first carrier signal becomes a peak, and a second demodulation section samples the detection signal of a second current sensor at sampling timing shifted by a phase ($-\theta$) from timing at which the second carrier signal becomes a peak.

4 Claims, 19 Drawing Sheets

(51) Int. Cl.
  *F16C 32/04* (2006.01)
  *F04D 27/00* (2006.01)
(58) Field of Classification Search
  CPC .............. F16C 32/0444; F16C 32/0455; F16C 32/0451; F16C 32/0446; F16C 32/0489
  USPC ............... 417/44.1, 423.4, 423.12; 310/90.5; 384/445, 446, 448
  See application file for complete search history.

(56) References Cited

U.S. PATENT DOCUMENTS

| | | |
|---|---|---|
| 7,417,398 B2 | 8/2008 | Kozaki |
| 7,525,784 B2 | 4/2009 | Kozaki |
| 7,564,670 B2 | 7/2009 | Kozaki |
| 7,679,248 B2 | 3/2010 | Kozaki |
| 7,737,590 B2 | 6/2010 | Oyama |
| 9,347,489 B2 | 5/2016 | Kozaki |
| 9,657,774 B2 * | 5/2017 | Kozaki ............... F16C 32/0489 |

* cited by examiner (a) α=0、θ=45°

(b) α=0、θ=45°

($\alpha=0.15$, $\theta=45°$)

($\alpha=0.15$, $\theta=45°$)

MAGNETIC BEARING DEVICE AND VACUUM PUMP

TECHNICAL FIELD

The present invention relates to a magnetic bearing device and a vacuum pump provided with the magnetic bearing device.

BACKGROUND ART

In an apparatus such as a magnetic bearing type turbomolecular pump which supports a rotor in a contactless manner by a magnetic bearing device, in order to maintain the rotor in a levitated state at a target position, the magnetic attraction force (electromagnet current) of an electromagnet is feedback-controlled in real time on the basis of the deviation (displacement) of the levitated position of the rotor from the target position.

In detection of the displacement, a method of performing the detection using a dedicated displacement sensor is common. However, in recent years, in order to achieve compactness and cost reduction, and improve the reliability, a sensorless type apparatus (also called a self-sensing type apparatus) has been coming into practical use. In the sensorless type apparatus, the dedicated sensor is omitted and an electromagnet which generates a levitation control force has not only a conventional actuator function, but also a sensing function (inductance system).

In the inductance system, a high-frequency carrier (sensor carrier) is applied to a dedicated sensor or an electromagnet coil to amplitude-modulate the sensor carrier by an inductance change caused by a levitation gap and then to demodulate the modulated sensor carrier, thereby obtaining a levitation gap signal (displacement signal). In the demodulation processing, there have been proposed many methods in which a digital technique is applied to synchronously sample and take in modulated wave signals by an AD converter, that is, many direct methods in which smoothing processing which may cause delay is not required.

A technique described in Patent Literature 1 (JP 2006-308074 A) relates to a configuration provided with a dedicated sensor. In this technique, the relationship between a sensor carrier frequency fc and a sampling frequency fs when sampling a modulated wave signal satisfies fs=2fc or fs=fc/n (n is a natural number). Since only a sensor carrier signal voltage is applied to the dedicated sensor, the S/N ratio of the signal is generally excellent. However, for example, when magnetic flux generated by a control current which excites an electromagnet affects a signal of a dedicated sensor coil such as a case where the electromagnet and the dedicated sensor are arranged in extremely close to each other in order to make an apparatus in which the magnetic bearing is mounted compact, a control current component (noise component) may be disadvantageously mixed to a signal component modulated on the basis of rotor displacement due to the influence of the magnetic flux.

Therefore, generally, most of the noise components are filtered by a band pass filter (a band pass filter having the sensor carrier frequency fc as the center frequency) provided immediately in front of an AD converter. However, in order to remove all of the noise components, it is necessary to make a Q value of the band pass filter further larger to achieve band-narrowing. However, when the band pass filter is made to have a narrow band, the demodulated displacement signal is largely delayed from the original signal, and the magnetic bearing control itself is deteriorated. Therefore application of the narrow band has a limit. Therefore, a noise component is left in the input signal of the AD converter, and the noise affects also the demodulated signal. Accordingly, a vibration component that is not actually displaced (vibrated) is mixed into the demodulated rotor displacement signal, and the displacement information thereof is fed back as it is to perform levitation control. As a result, the rotor is forcibly vibrated by the noise component, and the reaction force thereof is transmitted to the stator side, which may cause vibration of the apparatus.

A technique described in Patent Literature 2 (JP 2000-60169 A) relates to an apparatus provided with a dedicated sensor and a sensorless type apparatus. In the apparatus provided with a dedicated sensor, square wave signals inverted in sign at every sampling time under the condition of fs=2fc are generated by digital processing and output from a DA converter. Each of the square wave signals is modulated as a sensor carrier signal by a displacement signal (rotor displacement) by a sensor, and the modulated wave is taken in with the same frequency fs (=2fc) in synchronization with the peak timing. In demodulation processing, signal data taken in by an AD converter is processed by inverting the sign at every single sampling (inverting the sign at the minimum peak of the sensor carrier). Therefore, as with the invention described in Patent Literature 1, there is a problem of the generation of vibration.

Further, in the sensorless type apparatus, an electromagnet drive current signal on which a sensor carrier signal is superimposed is output from a DA converter, and the electromagnet is excited through a power amplifier. The superimposed sensor carrier signal is amplitude-modulated in the electromagnet coil. Therefore, the amplitude-modulated signal containing a displacement signal component is extracted, and demodulation processing in synchronization with the sensor carrier is performed in the same manner as in the apparatus provided with the dedicated sensor. However, in the sensorless type apparatus, a displacement signal is sensed by the electromagnet instead of the dedicated sensor. Therefore, not only the modulated signal of the superimposed sensor carrier signal, but also the control current signal is mixed in an equal or higher signal level. Therefore, the number of control current components (noise components) mixed into the amplitude-modulated signal is larger than that in the apparatus provided with the dedicated sensor.

A technique described in Patent Literature 3 (JP 2001-177919 A) relates to a sensorless type apparatus in which a sensor carrier component for sensing is superimposed on a drive current which excites an electromagnet. Basic signal processing is the same as that described in Patent Literature 2, and a different point is as follows. Specifically, sensor carriers (carrier waves) each of which is superimposed on each of a pair of electromagnets that face each other with a rotor interposed therebetween are applied in the opposite phase relationship. Accordingly, an amplitude-modulated signal containing a displacement signal component is efficiently separated and extracted from a control current component. However, the characteristics and the peripheral circumstances of one of the paired electromagnets never become completely the same as those of the other one of the paired electromagnets. Therefore, although there is a difference in degree, there is a problem of noise mixed into a displacement-modulated signal due to the same reason as in the sensorless type apparatus of Patent Literature 2.

SUMMARY OF THE INVENTION

A magnetic bearing device comprises: a first radial electromagnet supporting a rotor shaft in a contactless manner in a first radial direction; a second radial electromagnet supporting the rotor shaft in a contactless manner in a second radial direction; a first carrier generation section generating a first carrier signal; a second carrier generation section generating a second carrier signal whose phase differs by $(\pi/2+\theta)$ radian from the phase of the first carrier signal; a first displacement sensor modulating the first carrier signal depending on displacement of the position of the rotor shaft in the first radial direction to output a first modulated signal; a second displacement sensor modulating the second carrier signal depending on displacement of the position of the rotor shaft in the second radial direction to output a second modulated signal; a first demodulation section performing demodulation by sampling the first modulated signal at sampling timing shifted by a phase $\theta$ from timing at which the first carrier signal becomes a peak; a second demodulation section performing demodulation by sampling the second modulated signal at sampling timing shifted by a phase $(-\theta)$ from timing at which the second carrier signal becomes a peak; and a controller controlling current in each of the first radial electromagnet and the second radial electromagnet, based on a result of the demodulation by each of the first demodulation section and the second demodulation section.

The first demodulation section performs sampling with a frequency fs1 that satisfies fc=(m+½)×fs1 (where, m is an integer equal to or larger than zero) with respect to a frequency fc of the first carrier signal to output, as the demodulation result, a value d13=(d11−d12)/2 that is calculated from data d11 obtained by sampling the first modulated signal at timing shifted by the phase $\theta$ from timing at which the first carrier signal becomes a maximum peak and data d12 obtained by sampling the first modulated signal at timing shifted by the phase $\theta$ from timing at which the first carrier signal is located near a minimum peak position, and the second demodulation section performs sampling with a frequency fs2 that satisfies fc=(n+½)×fs2 (where, n is an integer equal to or larger than zero) with respect to a frequency fc of the second carrier signal to output, as the demodulation result, a value d23=(d21−d22)/2 that is calculated from data d21 obtained by sampling the second modulated signal at timing shifted by the phase $(-\theta)$ from timing at which the second carrier signal becomes a maximum peak and data d22 obtained by sampling the second modulated signal at timing shifted by the phase $(-\theta)$ from timing at which the second carrier signal is located near a minimum peak position.

The phase $\theta$ is set within the range of $-\pi/4 \le \theta \le \pi/4$.

A vacuum pump comprises a pump rotor; a motor driving the pump rotor to rotate; and the magnetic bearing device, the magnetic bearing device supporting the pump rotor by magnetic levitation.

A magnetic bearing device comprises: a first radial electromagnet supporting a rotor shaft in a contactless manner in a first radial direction; a second radial electromagnet supporting the rotor shaft in a contactless manner in a second radial direction; a first excitation amplifier supplying a first electromagnet current on which a first carrier signal for detecting displacement of the position of the rotor shaft in the first radial direction is superimposed to the first radial electromagnet; a second excitation amplifier supplying a second electromagnet current on which a second carrier signal for detecting displacement of the position of the rotor shaft in the second radial direction is superimposed to the second radial electromagnet; a first current sensor detecting the first electromagnet current; a second current sensor detecting the second electromagnet current; a first demodulation section sampling a detection signal of the first current sensor to extract rotor shaft position displacement information; a second demodulation section sampling a detection signal of the second current sensor to extract rotor shaft position displacement information; and a controller controlling each of the first excitation amplifier and the second excitation amplifier based on a result of demodulation by each of the first demodulation section and the second demodulation section. The phase of the second carrier signal differs by $(\pi/2+\theta)$ radian from the phase of the first carrier signal. The first demodulation section samples a detection signal of the first current sensor at sampling timing shifted by a phase $\theta$ from timing at which the first carrier signal becomes a peak. The second demodulation section samples detection signal of the second current sensor at sampling timing shifted by a phase $(-\theta)$ from timing at which the second carrier signal becomes a peak.

The first demodulation section performs sampling with a frequency 1 that satisfies fc=(m+½)×fs1 (where, m is an integer equal to or larger than zero) with respect to a frequency fc of the first carrier signal to output, as the demodulation result, a value d13=(d11−d12)/2 that is calculated from data d11 obtained by sampling the detection signal of the first current sensor at timing shifted by the phase $\theta$ from timing at which the first carrier signal becomes a maximum peak and data d12 obtained by sampling the detection signal of the first current sensor at timing shifted by the phase $\theta$ from timing at which the first carrier signal is located near a minimum peak position, and the second demodulation section performs sampling with a frequency fs2 that satisfies fc=(n+½)×fs2 (where, n is an integer equal to or larger than zero) with respect to a frequency fc of the second carrier signal to output, as the demodulation result, a value d23=(d21−d22)/2 that is calculated from data d21 obtained by sampling the detection signal of the second current sensor at timing shifted by the phase $(-\theta)$ from timing at which the second carrier signal becomes a maximum peak and data d22 obtained by sampling the detection signal of the second current sensor at timing shifted by the phase $(-\theta)$ from timing at which the second carrier signal is located near a minimum peak position.

The present invention makes it possible to improve the S/N ratio of displacement information in magnetic bearing control.

DETAILED DESCRIPTION OF THE EXEMPLARY EMBODIMENTS

Hereinbelow, embodiments of the present invention will be described with reference to the drawings.

—First Embodiment—

Figure 1:
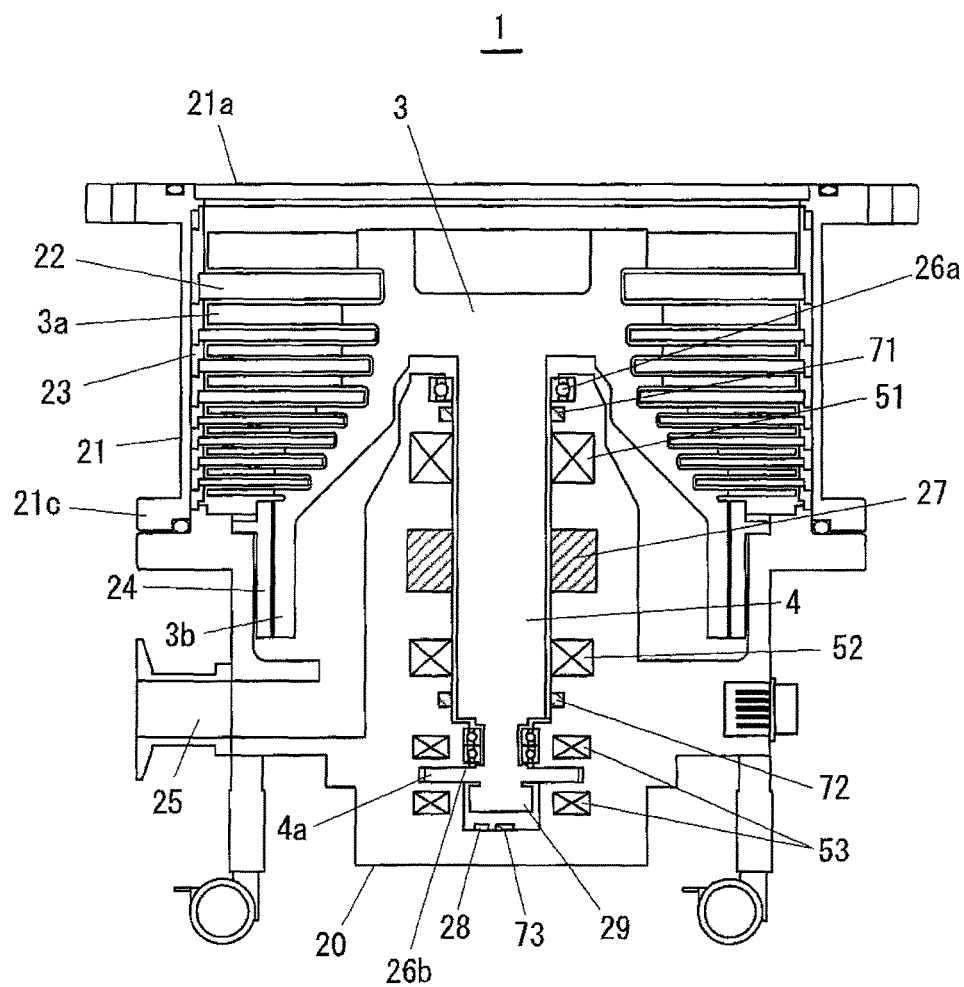
FIG. 1 is a diagram illustrating the schematic configuration of a magnetic bearing type turbo-molecular pump provided with a displacement sensor type magnetic bearing device.

FIG. 1 is a diagram illustrating the schematic configuration of a magnetic bearing type turbo-molecular pump provided with a displacement sensor type magnetic bearing device. The turbo-molecular pump includes a pump unit 1 and a control unit which controls the pump unit 1 to drive. In FIG. 1, the control unit is not illustrated.

A rotor shaft 4 which is provided in a rotor 3 is supported in a contactless manner by magnetic bearings 51 and 52 in a radial direction (radial magnetic bearings 51 and 52) and a magnetic bearing 53 in an axial direction (axial magnetic bearing 53). The magnetic bearing 53 is arranged so as to sandwich a thrust disc 4a which is fixed to a lower part of the rotor shaft 4 in the axial direction. The displacement of the levitated position of the rotor shaft 4 is detected by radial sensors 71 and 72 and an axial sensor 73 as displacement sensors. As each of the sensors 71 to 73, an inductance type displacement sensor that includes a sensor core and a coil wound around the sensor core is used.

The rotor 3 which is magnetically levitated in a freely rotatable manner by the magnetic bearings is driven to rotate at high speed by a motor 27. A brushless DC motor or the like is used as the motor 27. In FIG. 1, the motor 27 is schematically illustrated. However, more specifically, a part indicated by reference numeral 27 constitutes a motor stator, and a motor rotor is provided at the side of the rotor shaft 4.

The rotation of the rotor 3 is detected by a rotation sensor 28. A sensor target 29 is provided on the lower end of the rotor shaft 4 which is driven to rotate by the motor 27. The sensor target 29 integrally rotates with the rotor shaft 4. The axial sensor 73 described above and the rotation sensor 28 are arranged at a position facing the lower face of the sensor target 29. When the magnetic bearings are not operating, the rotor shaft 4 is supported by emergency mechanical bearings 26a and 26b.

On the rotor 3, a plurality of stages of rotor blades 3a and a cylindrical section 3b are formed to constitute a rotation side exhaust function section. On the other hand, on the stationary side, a plurality of stages of stationary blades 22 and a screw stator 24 are formed as a stationary side exhaust function section. The stationary blades 22 and the rotor blades 3a are alternately arranged in the axial direction. The screw stator 24 is provided on the outer peripheral side of the cylindrical section 3b with a predetermined gap therebetween.

Each of the stationary blades 22 is mounted on a base 20 with a spacer ring 23 interposed therebetween. When a fixed flange 21c of a pump case 21 is fixed to the base 20 with a bolt, stacked spacer rings 23 are sandwiched between the base 20 and the pump case 21, so that the stationary blades 22 are positioned. An exhaust port 25 is provided in the base 20. A back pump is connected to the exhaust port 25. The rotor 3 is driven to rotate at high speed by the motor 27 while being magnetically levitated, whereby gas molecules in a suction port 21a are discharged toward the exhaust port 25.

Figure 2:
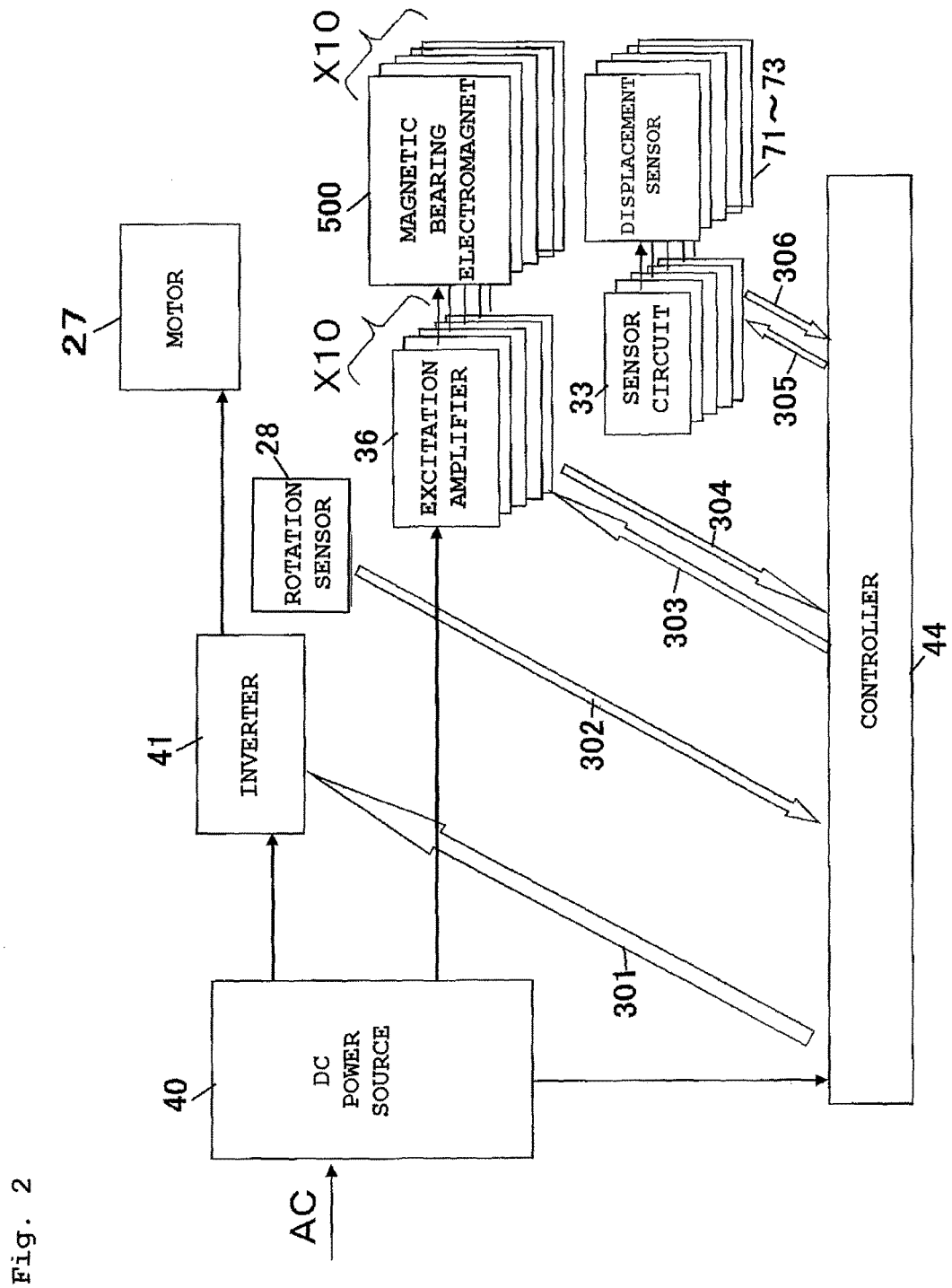
FIG. 2 is a block diagram illustrating the schematic configuration of a control unit.

FIG. 2 is a block diagram illustrating the schematic configuration of the control unit. AC input from the outside is converted from AC to DC by a DC power source 40 which is provided in the control unit. The DC power source 40 generates a power source for an inverter 41, a power source for an excitation amplifier 36, and a power source for the controller 44.

A plurality of switching elements are provided in the inverter 41 which supplies current to the motor 27. The motor 27 is driven by controlling ON/OFF of these switching elements by the controller 44.

Further, ten magnetic bearing electromagnets 500 illustrated in FIG. 2 represent magnetic bearing electromagnets provided in the magnetic bearings 51, 52, and 53. The magnetic bearing used in the turbo-molecular pump illustrated in FIG. 1 is a five-axis control type magnetic bearing. Each of the radial magnetic bearings 51 and 52 is a two-axis magnetic bearing, and provided with two pairs of magnetic bearing electromagnets 500 (namely, four magnetic bearing electromagnets 500). Further, the axial magnetic bearing 53 is a single-axis magnetic bearing, and provided with a pair of magnetic bearing electromagnets 500 (namely, two magnetic bearing electromagnets 500). The excitation amplifier 36 which supplies current to a magnetic bearing electromagnet 500 is provided in each of the ten magnetic bearing electromagnets 500. Therefore, ten excitation amplifiers 36 in total are provided in the control unit.

The controller 44 which controls the drive of the motor 27 and the drive of the magnetic bearings includes, for example, a digital arithmetic unit such as a field programmable gate array (FPGA) and a peripheral circuit thereof. In motor control, a PWM control signal 301 for ON/OFF controlling the switching elements provided in the inverter 41 is input from the controller 44 to the inverter 41, and a signal 302 relating to the rotation speed is input from the rotation sensor 28 to the controller 44. In magnetic bearing control, a PWM control signal 303 for ON/OFF controlling a switching element included in each of the excitation amplifiers 36 is input from the controller 44 to each of the excitation amplifiers 36, and an electromagnet current signal 304 relating to each of the magnetic bearing electromagnets 500 is input from each of the excitation amplifiers 36 to the controller 44. Further, a sensor carrier signal (carrier signal) 305 is input from the controller 44 to sensor circuits 33, and a sensor signal 306 modulated by displacement is input from each of the sensor circuits 33 to the controller 44.

Figure 3:
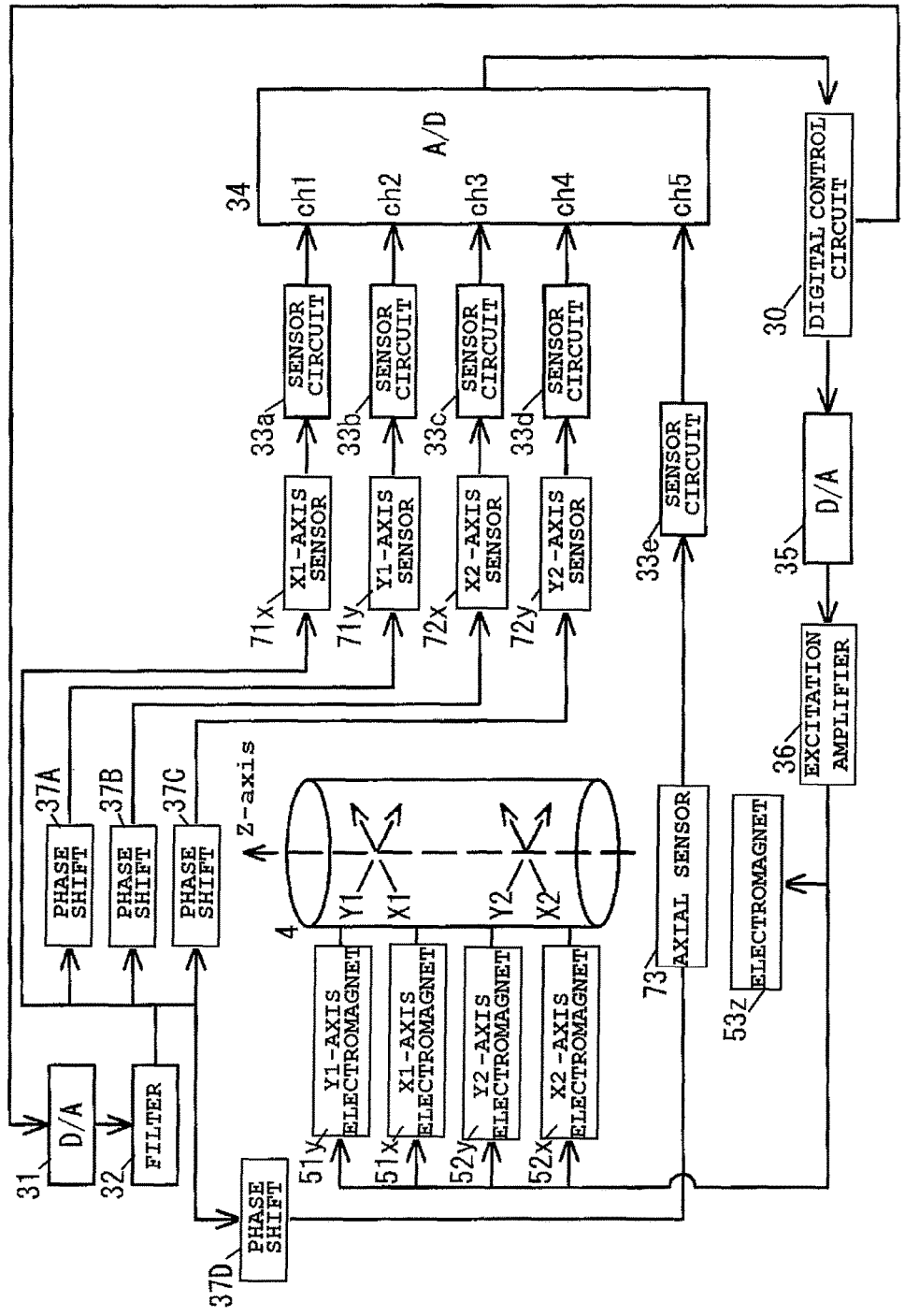
FIG. 3 is a block diagram illustrating the configuration of a five-axis control type magnetic bearing.

FIG. 3 is a block diagram illustrating the configuration of the five-axis control type magnetic bearing. In FIG. 3, a digital control circuit 30, a DA converter 31, a filter 32, an AD converter 34, a DA converter 35, and phase shift filters 37A to 37D correspond to the controller 44 of FIG. 2. The radial magnetic bearing 51 of FIG. 1 is provided with an X1-axis electromagnet 51x and a Y1-axis electromagnet 51y. The radial magnetic bearing 52 of FIG. 1 is provided with an X2-axis electromagnet 52x and a Y2-axis electromagnet 52y. Each of the electromagnets 51x, 51y, 52x, and 52y includes a pair of magnetic bearing electromagnets 500 (see FIG. 2) which face each other with the rotor shaft 4 interposed therebetween. An electromagnet 53z of the axial magnetic bearing 53 also includes a pair of magnetic bearing electromagnets 500. Further, the radial sensor 71 of FIG. 1 is provided with an X1-axis sensor 71x and a Y1-axis sensor 71y respectively corresponding to the X1-axis electromagnet 51x and the Y1-axis electromagnet 51y. Similarly, the radial sensor 72 is provided with an X2-axis sensor 72x and a Y2-axis sensor 72y respectively corresponding to the X2-axis electromagnet 52x and the Y2-axis electromagnet 52y.

As described above, each of the radial sensor 71 (71x, 71y), the radial sensor 72 (72x, 72y), and the axial sensor 73 is a inductance type displacement sensor, and converts gap displacement to an electrical signal using changes in the impedance of the sensor section caused by changes in the gap displacement. A sensor carrier signal having a frequency fc generated in the digital control circuit 30 is converted to an analog signal by the DA converter 31, and applied to each of the sensors 71x, 71y, 72x, 72y, and 73 through the filter 32 and the phase shift filters 37A to 37D.

The sensor carrier signal (carrier signal) applied to each of the sensors 71x, 71y, 72x, 72y, and 73 is amplitude-modulated depending on changes in the impedance of the sensor section caused by the gap displacement. The amplitude-modulated sensor carrier signal (hereinbelow, referred to as a displacement-modulated wave signal) is input to the AD converter 34 through each of the sensor circuits 33a to 33e. Analog signals from the respective sensor circuits 33a to 33e are sequentially converted to digital values by the AD converter 34, and input to the digital control circuit 30. Details of sampling in the AD converter 34 will be described below.

In the digital control circuit 30, an electromagnet current to be supplied to each of the electromagnets 51x, 51y, 52x, 52y, and 53 is calculated on the basis of a previously-stored magnetic levitation control constant and positional information converted to the digital values, and an electromagnet current control signal is output. The electromagnet current control signal is converted to an analog value by the DA converter 35, and then input to the excitation amplifier 36. In FIG. 3, only a single excitation amplifier 36 is illustrated. However, practically, the same number of excitation amplifiers 36 as the magnetic bearing electromagnets 500 (namely, ten excitation amplifiers 36) are provided as shown in FIG. 2, and the electromagnet current is supplied from the excitation amplifiers 36 to the respective magnetic bearing electromagnets 500.

Figure 4:
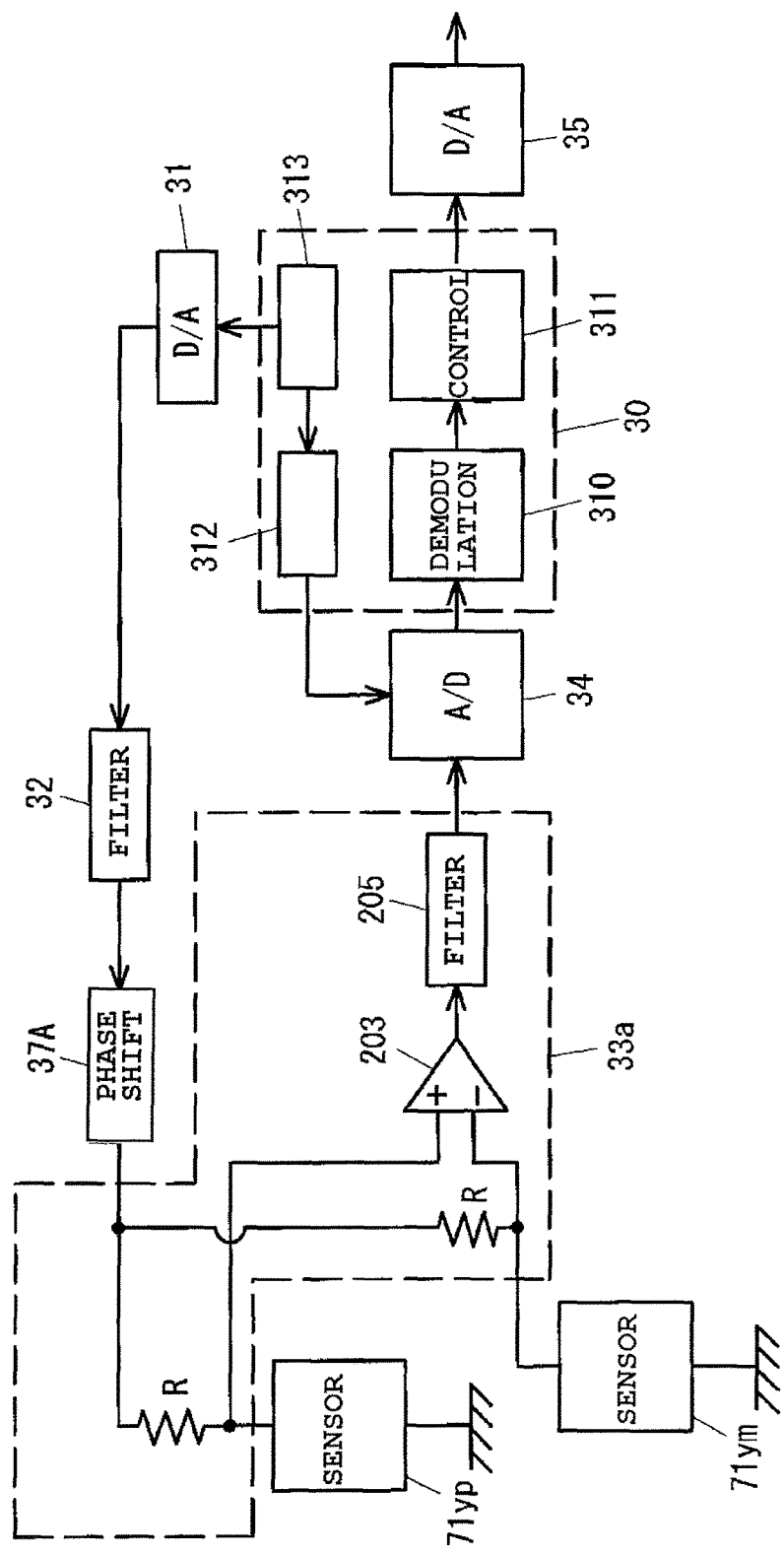
FIG. 4 is a diagram illustrating a control block relating to a Y1-axis sensor 71y of a radial sensor 71.

FIG. 4 is a diagram illustrating an example of a control block relating to the Y1-axis sensor 71y of the radial sensor (see FIG. 3). The Y1-axis sensor 71y includes a pair of sensors 71yp and 71ym which are arranged facing each other with the rotor shaft 4 interposed therebetween. A sinusoidal discrete value generated in a sinusoidal discrete value generation section 313 of the digital control circuit 30 is converted to an analog signal by the DA converter 31, and the analog signal is output to the filter 32. The output sensor carrier signal contains harmonics and therefore has a stepwise form. Therefore, a smooth sensor carrier signal can be obtained by filtering the output carrier sensor signal by the filter 32 which includes a low pass filter, a band pass filter, or the like.

The sensor carrier signal output from the filter 32 is subjected to processing for shifting the phase of the sensor carrier signal in a phase shift filter 37A. The sensor carrier signal output from the phase shift filter 37A is applied to the sensors 71yp and 71ym each of which is connected in series to a resistance R. The sensor carrier signals amplitude-modulated in the respective sensors 71yp and 71ym (displacement-modulated wave signals) are input to a differential amplifier 203. A differential signal of these displacement-modulated wave signals is output from the differential amplifier 203. The differential signal output from the differential amplifier 203 is subjected to band pass processing with a carrier frequency fc as a center frequency in a filter 205.

The signal output from the filter 205 is taken in by the digital control circuit 30 through the AD converter 34 by synchronous sampling. At this time, the sampling is performed on the basis of the sinusoidal discrete value generated in the sinusoidal discrete value generation section 313. In the present embodiment, the sinusoidal discrete value is phase-shifted by a predetermined amount by a phase shift section 312, and the sampling is performed on the basis of the phase-shifted sinusoidal discrete value. Then, demodulation arithmetic operation is performed in a demodulation arithmetic section 310 on the basis of the sampled data. A result of the arithmetic operation is input to a control arithmetic section 311, and an arithmetic operation of an electromagnet current control amount is performed in the control arithmetic section 311.

Although the sensor carrier signal that is output in synchronization with the AD converter 34 is output from the DA converter 31 in FIG. 3, the present invention is not limited thereto. For example, a sensor carrier sinusoidal signal may be temporarily PWM-modulated in digital and digitally output as a High/Low signal, and a PWM component may be removed by an analog low pass filter to obtain a sensor carrier signal.

An inductance type displacement sensor used in each of the sensors 71 to 73 detects the displacement by detecting changes in the magnetic flux interlinked with a sensor coil. Therefore, the detection is affected by magnetic flux formed by the electromagnet and magnetic flux formed by an adjacent displacement sensor, which disadvantageously affects the displacement detection as noise.

Figure 5:
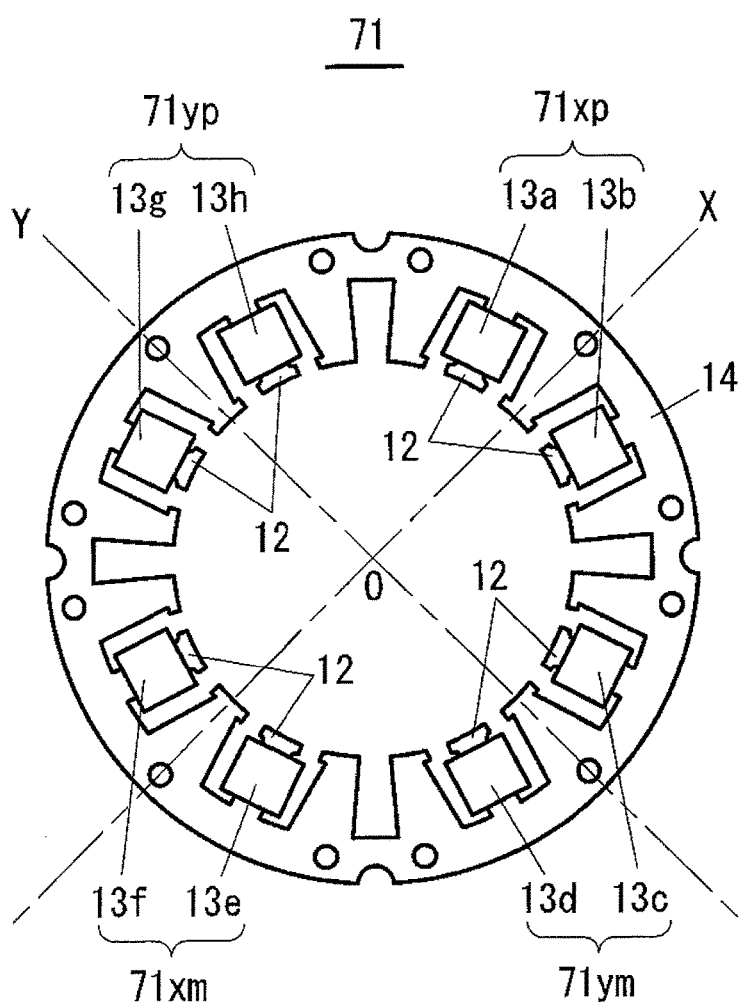
FIG. 5 is a diagram illustrating the appearance of the radial sensor 71.

FIG. 5 is a diagram illustrating the appearance of the radial sensor 71. FIG. 5 is a plan view of the radial sensor 71 viewed along the Z-axis direction. The radial sensor 71 includes radial sensors for two axes (71x and 71y of FIG. 3). The radial sensor 71 is provided with a ring-like core 14 which is made of an electromagnetic steel plate and has a plurality of teeth 12 formed in a projecting manner on the inner periphery thereof and sensor coils 13a to 13h each of which is wound around a predetermined one of the teeth 12.

A pair of sensor coils 13a and 13b constitutes a sensor coil of the radial sensor 71xp. A pair of coils 13e and 13f constitutes a sensor coil of the radial sensor 71xm. A pair of coils 13c and 13d constitutes a sensor coil of the radial sensor 71ym. A pair of coils 13g and 13h constitutes a sensor coil of the radial sensor 71yp.

For example, magnetic force lines emitted from the tooth 12 of the sensor coil 13a enters the tooth 12 of the coil 13b which is paired with the sensor coil 13a, passes through the core 14, and returns to the tooth 12 of the sensor coil 13a. However, since the core 14 has a ring-like shape, some of the magnetic force lines leak out to the teeth of adjacent radial sensors, in this case, the radial sensors 71yp and 71ym, and are interlinked with the sensor coils thereof. The same is true in the other radial sensors 71xm, 71yp, and 71ym. Since the sensor coils 13a to 13h are provided in the single ring-like core 14 in this manner, the radial sensors 71xp to 71ym are affected by leakage magnetic flux (namely, sensor current) from the adjacent radial sensors. In other words, the influence of the leakage magnetic flux acts as noise for a sensor carrier signal of the affected radial sensor.

As described above, noise in the displacement sensors includes a first noise component caused by an electromagnet current or the like and a second noise component caused by the interference with an adjacent displacement sensor. The second noise component is noise within a sensor carrier frequency range. However, the frequency range of the first noise component is lower than that of the second noise component, more specifically, approximately 1/10 of the frequency range of the second noise component.

(Removal of First Noise Component)

As illustrated in FIG. 5, the X1-axis sensor 71x of the radial sensor 71 has the pair of sensors 71xp and 71xm arranged facing each other with the rotor shaft 4 interposed therebetween. When a gap between the teeth 12 of each of the sensors 71xp and 71xm and the rotor shaft 4 is large, an inductance value of the sensor coil becomes small. On the other hand, when the gap is small, the inductance value of the sensor coil becomes large. Therefore, as the inductance value of one of the facing sensors 71xp and 71xm becomes larger, the inductance value of the other one of the sensors 71xp and 71xm becomes smaller. That is, changes in the gap, namely, displacement information of the rotor shaft 4 can be obtained from changes in the inductance of each of the facing sensors 71xp and 71xm.

When the inductances of the coils of the facing sensors 71xp and 71xm are respectively denoted by Lsp and Lsm, following Expression (1) approximately holds. In Expression (1), Ds denotes a gap between the rotor shaft 4 and each of the sensors 71xp and 71xm when the rotor shaft 4 is located at the levitation center axis (levitation target position), and ds denotes displacement from the levitation target position. Further, As is a constant.

$$1/Lsp = As \times (Ds - ds)$$

$$1/Lsm = As \times (Ds + ds) \quad \text{[Expression (1)]}$$

When the coil resistance is approximately ignored, the relationship between a voltage vsp applied to the sensor coil and a current isp flowing in the sensor coil and the relationship between a voltage vsm applied to the sensor coil and a current ism flowing in the sensor coil can be represented by following Expression (2). In Expression (2), d (isp)/dt denotes the time derivative of isp.

$$vsp = Lsp \times d(isp)/dt$$

$$vsm = Lsm \times d(ism)/dt \quad \text{[Expression (2)]}$$

When each of the voltage vsp and the voltage vsm applied to the sensor coils is represented as "$-v \sin(\omega c \times t)$" (where, $\omega c = 2\pi \times fc$), each of the current isp and the current ism flowing in the sensor coils is represented as following Expression (3) from Formulae (1) and (2). In Expression (3), $Bs = v \times As/\omega c$. In this manner, the current isp and the current ism are amplitude-modulated on the basis of changes with time of the displacement ds. In the case of the radial sensor, a differential signal between the current isp and the current ism is used as a displacement-modulated wave signal. Therefore, the differential signal is represented as Expression (4).

$$\begin{aligned} isp &= -v \times \sin(\omega c \times t - \pi/2)/(\omega c \times Lsp) \\ &= -Bs(Ds - ds) \times \sin(\omega c \times t - \pi/2) \end{aligned} \quad \text{[Expression (3)]}$$

$$\begin{aligned} ism &= -v \times \sin(\omega c \times t - \pi/2)/(\omega c \times Lsm) \\ &= -Bs(Ds + ds) \times \sin(\omega c \times t - \pi/2) \end{aligned}$$

$$\begin{aligned} \Delta is &= isp - ism \\ &= 2Bsds \times \sin(\omega c \times t - \pi/2) \end{aligned} \quad \text{[Expression (4)]}$$

Figure 6A:
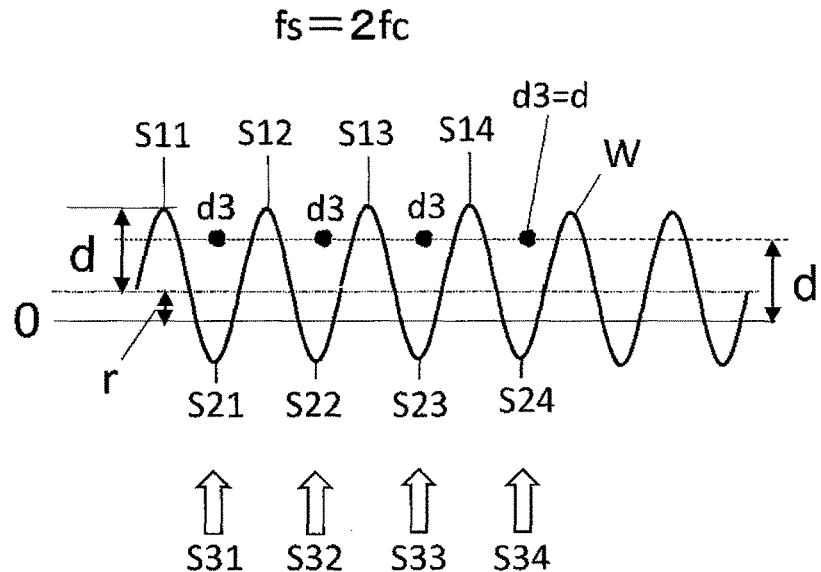
FIGS. 6A and 6B are diagrams qualitatively illustrating sampling and demodulation processing for removing a first noise component.
Figure 6B:
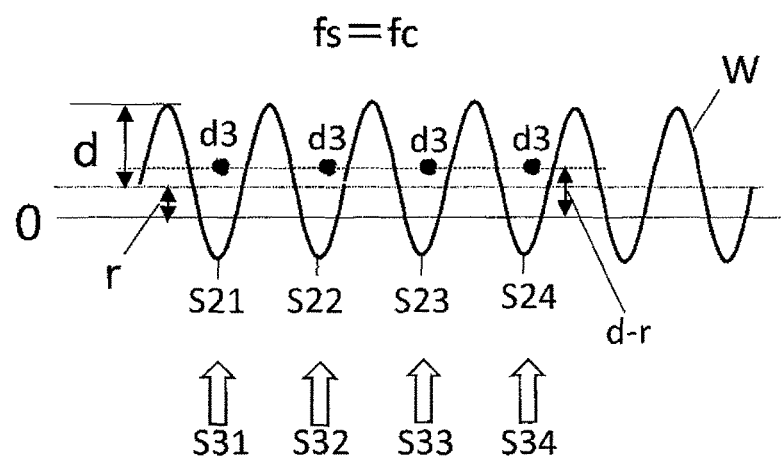

FIGS. 6A and 6B are diagrams qualitatively illustrating sampling and demodulation processing for removing the first noise component. FIG. 6A illustrates processing in the present embodiment. FIG. 6B illustrates conventional processing. In FIGS. 6A and 6B, a vibration waveform W indicates a displacement-modulated wave signal input to the AD converter 34, and r denotes a noise component.

For example, in the case of noise caused by the electromagnet current, the noise component has a frequency lower than the sampling frequency fs. Here, in order to confirm the qualitative influence, the noise is approximately regarded as DC noise. Further, a case where the displacement-modulated wave signal is obtained by being simply modulated on the basis of only DC displacement is assumed. Therefore, the noise component r is constant, and amplitude 2Bsds of the input signal W is also a constant value. When 2Bsds=d, a signal input to the AD converter 34 can be represented as (DC modulation)+(DC noise)=d×sin(2πfc×t)+r.

In the present embodiment, when performing the taking-in by synchronous sampling, the taking-in is performed in synchronization with the maximum peak timing (S11, S12, S13, S14, . . . ) and the minimum peak timing (S21, S22, S23, S24, . . . ) of the sensor carrier signal in the relationship of fc=(n+½)×fs. Here, fc denotes a carrier frequency, and fs denotes a sampling frequency. An example of FIG. 6A illustrates a case where n=0 in fc=(n+½)×fs (namely, fs=2 fc). That is, the sampling is performed at the peak timing of a period 1/(2×fc) which is half the period of the carrier frequency fc (namely, doubled frequency 2fc). Here, a data value taken in at the maximum peak timing (S11, S12, S13, S14, . . . ) is denoted by d1 (=d+r), and a data value taken in at the minimum peak timing (S21, S22, S23, S24, . . . ) is denoted by d2 (=−d+r).

The demodulation arithmetic section 310 of FIG. 4 performs an arithmetic operation represented by following Expression (5) on the basis of the sampling data value d1 taken in at the maximum peak timing S11 and the sampling data value d2 taken in at the minimum peak timing S21. In FIGS. 6A and 6B, arrows S31 to S34 indicate output timings of an arithmetic result. In the example illustrated in FIGS. 6A and 6B, the output timings S31 to S34 are set to be the same as the minimum peak timings S21 to S24. An arithmetic result d3 based on the data value d1 at the maximum peak timing S11 and the data value d2 at the minimum peak timing S21 is output as demodulation arithmetic output at the output timing S31 (which is the same as the minimum peak timing S21).

$$d3=(d1-d2)/2 \quad \text{[Expression (5)]}$$

Similarly, at the output timing S32 (which is the same as the minimum peak timing S22), a value d3 based on the sampled data value d1 at the maximum peak timing S12 and the sampled data value d2 at the minimum peak timing S22 is output as the demodulation arithmetic output. As described above, the arithmetic result is output in the same manner also at the other output timings (S33, S34, . . . ). The output timings (S31, S32, S33, S34, . . . ) are set to be the same as the respective minimum peak timings (S21, S22, S23, S24, . . . ). As can be seen from Expression (5), in the case of DC noise, the noise component r is completely cancelled. In the example illustrated in FIG. 6A, the sensor carrier signal is based on DC displacement. Therefore, the demodulation arithmetic output d3 is equal to the amplitude value d.

In other words, the demodulation arithmetic output d3 is output at the minimum peak timing (S21, S22, S23, S24, . . . ) of the signal waveform of the carrier frequency fc (namely, frequency 1/fc). Further, the output timings of the demodulation arithmetic output d3 (S31, S32, S33, S34, . . . ) may also be set to be the same as the respective maximum peak timings (S11, S12, S13, S14, . . . ). For example, when the demodulation arithmetic output d3 is output at the maximum peak timing S12, the demodulation arithmetic output d3 is calculated on the basis of the data value d2 at the minimum peak timing S21 and the data value d1 at the maximum peak timing S12.

On the other hand, FIG. 6B illustrates a case where the taking-in is performed at the minimum peak timing with fs=fc, and the demodulation arithmetic output d3 is output at the minimum peak timing, which is different from the present embodiment. In this case, a value −d2 (=d−r) which is obtained by positive/negative inverting the sampled data value d2 (=−d+r) is output as the demodulation arithmetic output d3. That is, a value r resulting from noise is included in the demodulation arithmetic output d3 as an error. In this manner, mixed noise having a low frequency caused by the electromagnet current is also taken in as the demodulation signal. As a result, a vibration component that is not actually displaced (vibrated) is left being mixed in the demodulated rotor displacement signal (displacement information), and the rotor displacement signal is fed back to perform the magnetic levitation control. Therefore, the rotor is forcibly vibrated by the noise, and the reaction force thereof is transmitted to the pump case 21, which causes vibration of the pump unit 1.

However, in the present embodiment, the noise component r is substantially cancelled when d3=(d1−d2)/2 is calculated as described above. Therefore, the noise (first noise component) included in the demodulated rotor displacement signal can be reduced. As a result, the vibration of the pump can be prevented.

Figure 7A:
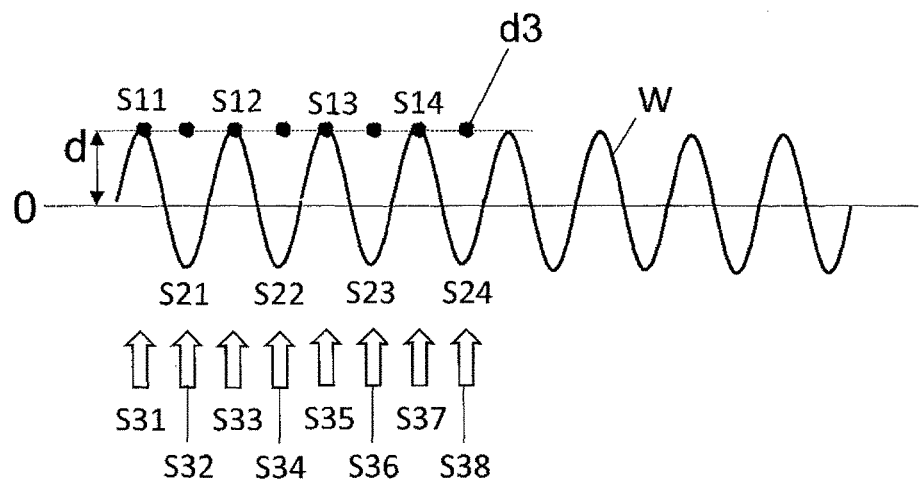
FIGS. 7A and 7B are diagrams illustrating another example of the sampling and the demodulation processing for removing the first noise component.
Figure 7B:
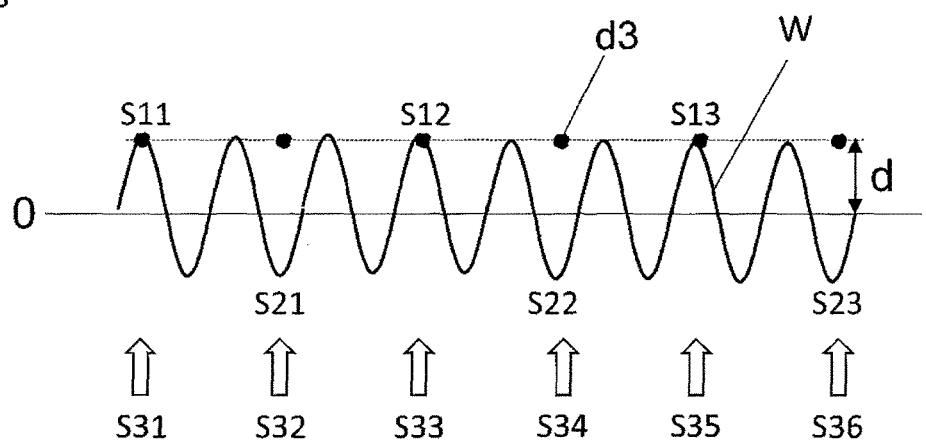

In the example illustrated in FIG. 6A, there has been described the case where the peak values (the maximum peak value and the minimum peak value) are sampled with the sampling frequency fs=2×fc, and the demodulation arithmetic output d3 is output at the peak timing of the period 1/fc. However, the sampling timing and the output timing are not limited thereto. FIGS. 7A and 7B illustrate a case where a sampling period and an output period of the demodulation arithmetic output d3 are the same as each other. In FIGS. 7A and 7B, the input signal W is represented with the noise component r=0, and therefore represented as d×sin(2πfc×t).

FIG. 7A illustrates a case where the peak value is sampled with fs=2×fc, and the demodulation arithmetic output d3 is output at the peak timing of a period 1/(2×fc) which is the same as the sampling period. By performing the sampling of the peak value with fs=2×fc, the data value d1 at the maximum peak timing (S11, S12, S13, S14, . . . ) and the data value d2 at the minimum peak timing (S21, S22, S23, S24, . . . ) of the sensor carrier are taken in. Then, the demodulation arithmetic output d3 (=(d1−d2)/2) is output at the output timing (S31, S32, S33, S34, S35, . . . ). Odd-numbered output timings (S31, S33, S35, S37, . . . ) are the same as the maximum peak timings (S11, S12, S13, S14, . . . ). On the other hand, even-numbered output timings (S32, S34, S36, S38, . . . ) are the same as the minimum peak timings (S21, S22, S23, S24, . . . ).

For example, when the demodulation arithmetic output d3 is output at the output timing S32 which is the same as the minimum peak timing S21, the demodulation arithmetic output d3 is calculated on the basis of the data value d1 at the maximum peak timing S11 and the data value d2 at the minimum peak timing S21. On the other hand, when the demodulation arithmetic output d3 is output at the output timing S33 which is the same as the maximum peak timing S12, the demodulation arithmetic output d3 is calculated on the basis of the data value d1 at the maximum peak timing S12 and the data value d2 at the minimum peak timing S21. That is, the demodulation arithmetic output d3 is calculated on the basis of the most recently taken-in two data values d1 and d2.

FIG. 7B illustrates a case where n=1 in fc=(n+½)×fs. In FIG. 7B, the peak value is sampled with fs=(⅔)×fc, and the demodulation arithmetic output d3 is output at the peak timing of a period 1/((⅔)×fc) which is the same as the sampling period. More specifically, the sampling is performed at a frequency of twice per three periods of the carrier frequency fc to take in the data value d1 at the maximum peak timing and the data value d2 at the minimum peak timing. Further, the demodulation arithmetic output d3 is output at the timing of acquiring the data value d1 or d2.

For example, at the output timing S32 which is the same as the minimum peak timing S21, the demodulation arithmetic output d3 is output on the basis of the data value d1 at the maximum peak timing S11 and the data value d2 at the minimum peak timing S21. Further, at the output timing S33 which is the same as the maximum peak timing S12, the demodulation arithmetic output d3 is output on the basis of the data value d1 at the maximum peak timing S12 and the data value d2 at the minimum peak timing S21.

Figure 8A:
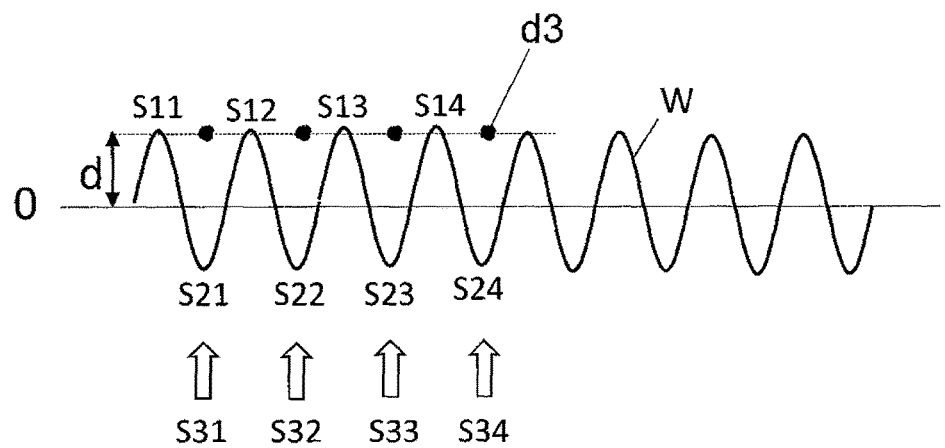
FIGS. 8A and 8B are diagrams illustrating yet another example of the sampling and the demodulation processing for removing the first noise component.

In an example illustrated in FIG. 8A, the peak value is sampled with fs=2×fc, and the demodulation arithmetic output d3 is output at the minimum peak timing of a period 1/fc. The demodulation arithmetic output d3 is calculated on the basis of the most recently taken-in two data values d1 and d2. In comparison with the example illustrated in FIG. 7A, the output frequency of the demodulation arithmetic output d3 is ½. Therefore, in the case illustrated in FIG. 8A, the arithmetic load can be reduced. On the other hand, in the case illustrated in FIG. 7A, a higher frequency component of noise included in the sensor signal can be removed.

Figure 8B:
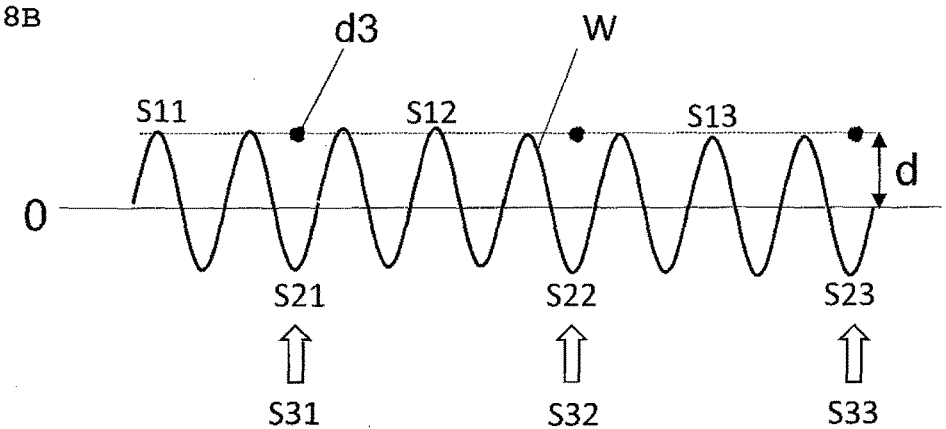

In an example illustrated in FIG. 8B, the peak value is sampled with fs=(⅔)×fc, and the demodulation arithmetic output d3 is output at the minimum peak timing of a period 1/(fc/3) which is twice the sampling period. In comparison with the example illustrated in FIG. 7B, the output frequency of the demodulation arithmetic output d3 is ½. Therefore, the arithmetic load can be further reduced in the case illustrated in FIG. 8A than the case illustrated in FIG. 7B.

As illustrated in FIGS. 6A to 8B, in the present embodiment, by performing the sampling in the relationship of fc=(n+½)×fs, the data values d1 at the maximum peak timings and the data values d2 at the minimum peak timings of the sensor carrier are alternately taken in. Further, by outputting the demodulation arithmetic output d3 on the basis of the most recently taken-in data values d1 and d2 of the output timing, the noise component r is substantially cancelled. The vibration of the pump caused by noise can be prevented by controlling the electromagnet current on the basis of the arithmetic result d3.

(Removal of Second Noise Component)

The differential signal Δis represented by Expression (4) is in the case where there is no interference with an adjacent displacement sensor. When there is interference with an adjacent displacement sensor, the differential signal Δis is affected by the influence of current in the adjacent displacement sensor. Here, description will be made by defining an axis that receives interference as the X axis (Xp side, Xm side) and an axis that applies the interference as the Y axis (Yp side, Ym side). A differential signal in the X axis is denoted by Δixs and a differential signal in the Y axis is denoted by Δiys, and the influence of interference is simply considered as the second term in the following Formulae (6) and (7). In Expression (7), φ denotes the phase shift of a sensor carrier signal of the Y-axis sensor relative to a sensor carrier signal of the X-axis sensor.

$$\Delta ixs = 2Bsdxs \times \sin(\omega cxt - \pi/2) + \alpha \times \Delta iys \quad \text{[Expression (6)]}$$

$$\Delta iys = 2Bsdys \times \sin(\omega cxt - \pi/2 + \phi) + \alpha \times \Delta ixs \quad \text{[Expression (7)]}$$

When Expression (7) is substituted into Expression (6) and the term of $\alpha^2$ is ignored due to $\alpha \ll 1$, the differential signal Δixs is represented as following Expression (8). Similarly, the differential signal Δiys is represented as following Expression (9). That is, noise αdys caused by the interference of the Y axis is added to the signal dxs, and noise αdxs caused by the interference of the X axis is added to the signal dys.

$$\Delta ixs = 2Bsdxs \times \sin(\omega cxt - \pi/2) + 2Bs\alpha dys \times \sin(\omega cxt - \pi/2 + \phi) \quad \text{[Expression (8)]}$$

$$\Delta iys = 2Bsdys \times \sin(\omega cxt - \pi/2 + \phi) + 2Bs\alpha dxs \times \sin(\omega cxt - \pi/2) \quad \text{[Expression (9)]}$$

In the present embodiment, the phase shift φ of the sensor carrier signal in the Y axis is set to φ=90°+θ. Further, upon sampling, sampling of the data d1 and the sampling of the data d2 are respectively performed with shifting the phase by θ from the maximum and minimum peaks of the sensor carrier signals in the X axis and the Y axis. By performing the sampling at such timing, the second term of each of Expression (8) and Expression (9) becomes zero, and the influence of interference of the adjacent axis can therefore be removed. Further, θ satisfies −45°≤θ≤45°.

For example, a case where the data d1 and the data d2 are sampled at the maximum and minimum peaks with θ=0 will be described by taking the radial sensor 71 as an example. A Y1-axis sensor carrier signal is generated with shifting the phase by 90° so that the phase shift φ in each of Formulae (8) and (9) becomes 90°. More specifically, the phase of the Y1-axis sensor carrier signal is shifted by 90° by the phase shift filter 37A of FIGS. 3 and 4. In this case, Expression (8) and Expression (9) described above are respectively represented as following Expression (10) and Expression (11).

$$\Delta ixs = 2Bsdxs \times \sin(\omega cxt - \pi/2) + 2Bs\alpha dys \times \sin(\omega cxt) \quad \text{[Expression (10)]}$$

$$\Delta iys = 2Bsdys \times \sin(\omega cxt) + 2Bs\alpha dxs \times \sin(\omega cxt - \pi/2) \quad \text{[Expression (11)]}$$

Figure 9A:
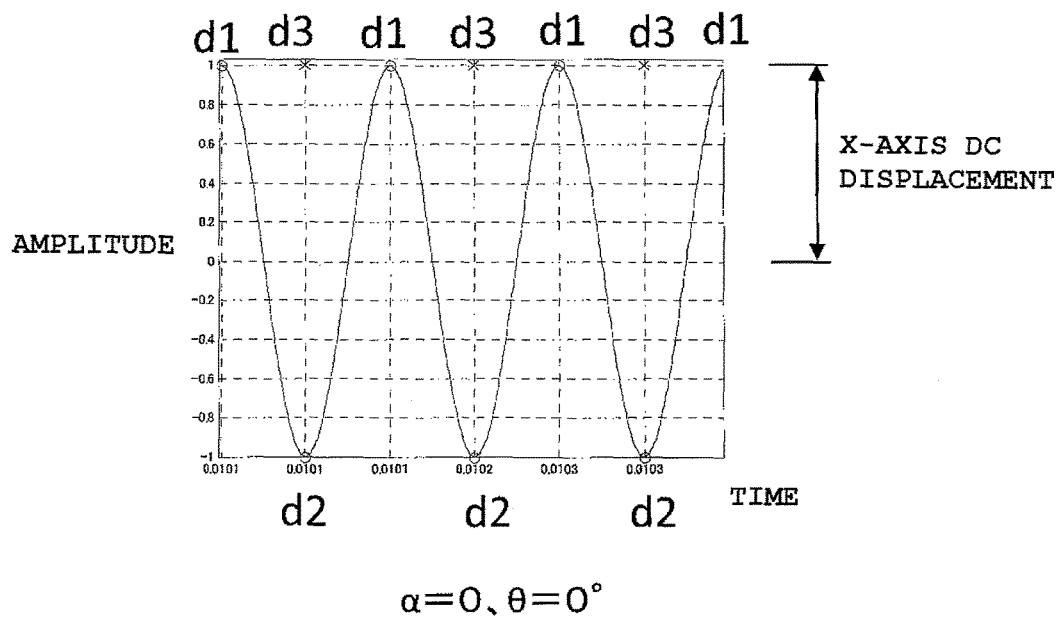
FIGS. 9A and 9B are graphs respectively illustrating a differential signal Δixs and a differential signal Δiys when there is no interference.
Figure 9B:
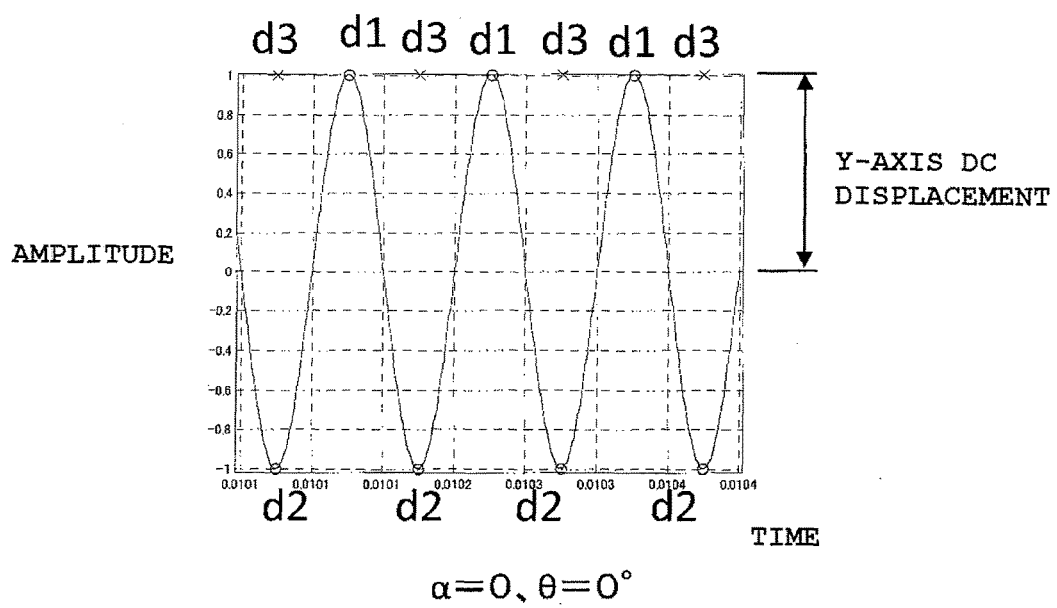

First, a case where there is no interference (α=0) will be described. FIGS. 9A and 9B are graphs illustrating the differential signals Δixs and Δiys when there is no interference. More specifically, FIG. 9A illustrates the differential signal Δixs=2Bsdxs×sin(ωcxt−π/2) when α=0 in Expression (10), and FIG. 9B illustrates the differential signal Δiys=2Bsdys×sin(ωcxt) when α=0 in Expression (11). Further, in FIGS. 9A and 9B, 2Bsdxs=2Bsdys=1. It can be seen that the phase of the differential signal Δixs and the phase of the differential signal Δiys are shifted from each other by 90° (=π/2 radian). In the case of FIGS. 9A and 9B, the differential signal Δiys has a leading phase by 90°. This is because of that the Y-axis sensor carrier signal is advanced in phase by 90° relative to the X-axis carrier signal.

Further, when taking in the data d1 and the data d2 from the AD converter 34, the data d1 and the data d2 are taken in respectively in synchronization with the maximum peak and the minimum peak of the carrier signal. Since the Y-axis sensor carrier signal is advanced in phase by 90° relative to the X-axis carrier signal, as can be seen from FIGS. 9A and 9B, time at which each of the data d1 and the data d2 of the differential signal Δiys is taken in is earlier than time at which each of the data d1 and the data d2 of the differential signal Δixs is taken in by an amount corresponding to a phase of 90°.

As a result, in both of the differential signals Δixs and Δiys, the data d1 is sampled at the maximum peak, and the data d2 is sampled at the minimum peak. In the differential signal Δixs, d1=2Bsdxs and d2=−2Bsdxs. Therefore, by calculating d3=d1−d2/4Bs, X-axis DC displacement dxs can be obtained. The same is true in the differential signal Δiys.

Figure 10:
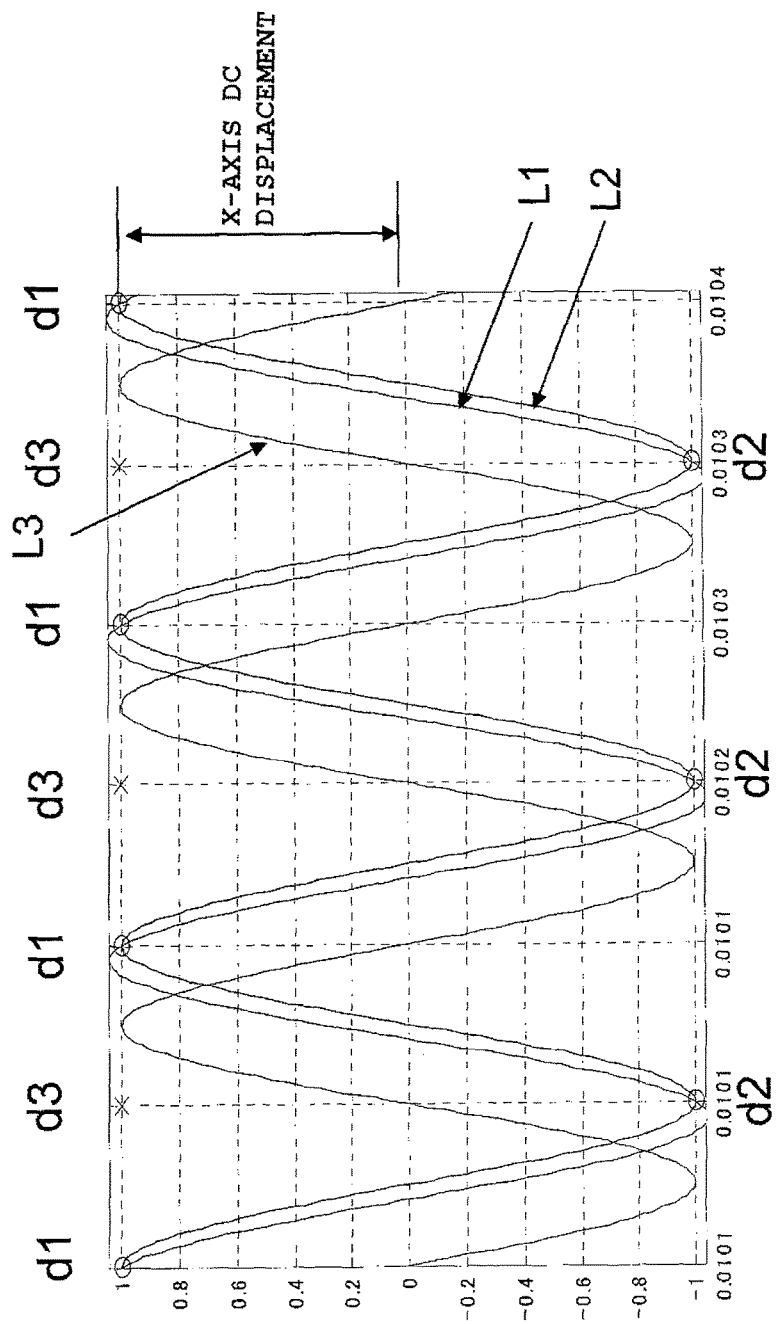
FIG. 10 is a diagram illustrating the differential signal Δixs that has received Y-axis interference.
Figure 11:
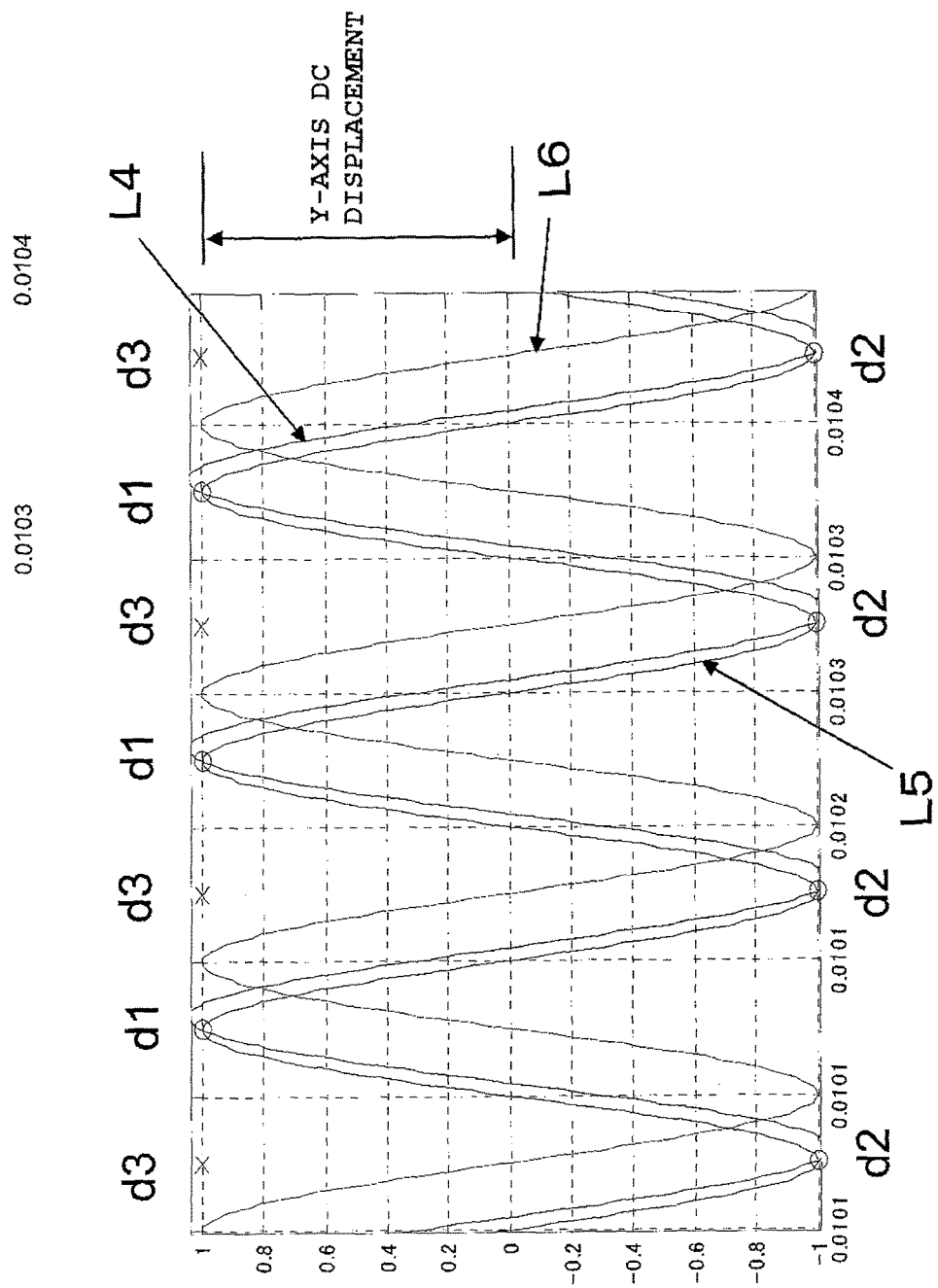
FIG. 11 is a diagram illustrating the differential signal Δiys that has received X-axis interference.

FIGS. 10 and 11 illustrate a case where there is interference, wherein α=0.15. FIG. 10 is a diagram illustrating the differential signal Δixs that has received Y-axis interference. In FIG. 10, a line L2 indicating 2Bsdxs×sin(ωcxt−π/2) and a line L3 indicating 2Bsdys×sin(ωcxt) are illustrated together with a line L1 indicating the differential signal Δixs. FIG. 11 is a diagram illustrating the differential signal Δiys that has received X-axis interference. In FIG. 11, a line L5 indicating 2Bsdys×sin (ωcxt) and a line L6 indicating 2Bsdxs×sin(ωcxt−π/2) are illustrated together with a line L4 indicating the differential signal Δiys.

In FIG. 10, sampling timing of the data d1 is one at which the first term of Expression (10) (line L2) becomes the maximum peak (t=(n+½)/fc, where n is an integer). Further, sampling timing the data d2 is one at which the line L2 becomes the minimum peak (t=n/fc, where n is an integer). As described above, since the Y-axis sensor carrier signal is shifted in phase by 90° relative to the X-axis sensor carrier signal, the first term and the second term of Expression (10) are shifted in phase from each other by 90°. Therefore, at t=(n+½)/fc and t=n/fc, the second term of Expression (10) (namely, the line L3) which is a noise component caused by the Y-axis interference is zero. As a result, it can be understood that the demodulation arithmetic result d3=(d1−d2/4Bs) accurately demodulates the X-axis DC displacement dxs.

Similarly, also in the case of the differential signal Δiys illustrated in FIG. 11, the data d1 is sampled at the maximum peak of the line L5 which indicates the first term of Expression (11), and the data d2 is sampled at the minimum peak of the line L5. As described above, the Y-axis carrier signal is advanced in phase by 90° relative to the X-axis carrier signal. Therefore, sampling time of each of the data d1 and the data d2 in the differential signal Δiys is earlier than that in the differential signal Δixs by a time corresponding to a phase of 90°.

The second term of Expression (11) becomes zero at such sampling timing. Therefore, a noise component caused by the Y-axis interference is not contained in the sampled data d1 and data d2. As a result, the demodulation arithmetic result d3 =(d1−d2/4Bs) accurately demodulates the Y-axis DC displacement dys.

In FIGS. 10 and 11, the sampling is performed at the timing when the first term of each of Expression (10) and Expression (11) becomes the maximum and minimum peaks. However, hereinbelow, a case where the sampling is performed at timing when the phase is shifted by θ from the maximum and minimum peaks of the first term will be described. A general control type magnetic bearing includes five axes as illustrated in FIG. 3. When the number of control axes is large in this manner, for the convenience of the taking-in by the AD converter 34, the taking-in is performed with shifting the phase from the maximum and minimum peaks in many cases.

The phase difference φ of the Y-axis sensor carrier signal from the X-axis sensor carrier signal is represented by φ=90°+θ, where θ denotes the phase shift from the maximum and minimum peaks. Further, θ satisfies −45°≤θ≤45°. Further, in the differential signal Δixs at the X-axis side, the data d1 and the data d2 are sampled in synchronization with timing shifted by θ from the maximum and minimum peaks of the X-axis sensor carrier signal. On the other hand, in the differential signal Δiys at the Y-axis side, the data d1 and the data d2 are sampled in synchronization with timing shifted by θ from the maximum and minimum peaks of the Y-axis sensor carrier signal. The differential signals Δixs and Δiys are respectively represented as following Expression (12) and Expression (13).

$$\Delta ixs = 2Bsdxs \times \sin(\omega c x t - \pi/2) + 2Bs\alpha dys \times \sin(\omega c x t + \theta) \quad \text{[Expression (12)]}$$

$$\Delta iys = 2Bsdys \times \sin(\omega c x t + \theta) + 2Bs\alpha dxs \times \sin(\omega c x t - \pi/2) \quad \text{[Expression (13)]}$$

Time corresponding to the timing at which the phase is shifted (advanced) by θ from the maximum peak of the first term of Expression (12) is $t=(n+\frac{1}{2})/fc-\theta/(2\pi fc)$. Further, time corresponding to the timing at which the phase is shifted (advanced) by θ from the minimum peak is $t=n/fc-\theta/(2\pi fc)$. In these formulae, n is an integer. By setting the sampling timing of the differential signal Δixs in this manner, the second term of Expression (12) which represents the Y-axis noise component becomes zero.

On the other hand, in Expression (13), time corresponding to the timing at which the phase is shifted (delayed) by θ from the maximum peak of the first term is $t=(n+\frac{1}{4})/fc$. Further, time corresponding to the timing at which the phase is shifted (delayed) by θ from the minimum peak of the first term is $t=(n-\frac{1}{4})/fc$. By setting the sampling timing of the differential signal Δiys in this manner, the second term of Expression (12) which represents the Y-axis noise component becomes zero.

Figure 12A:
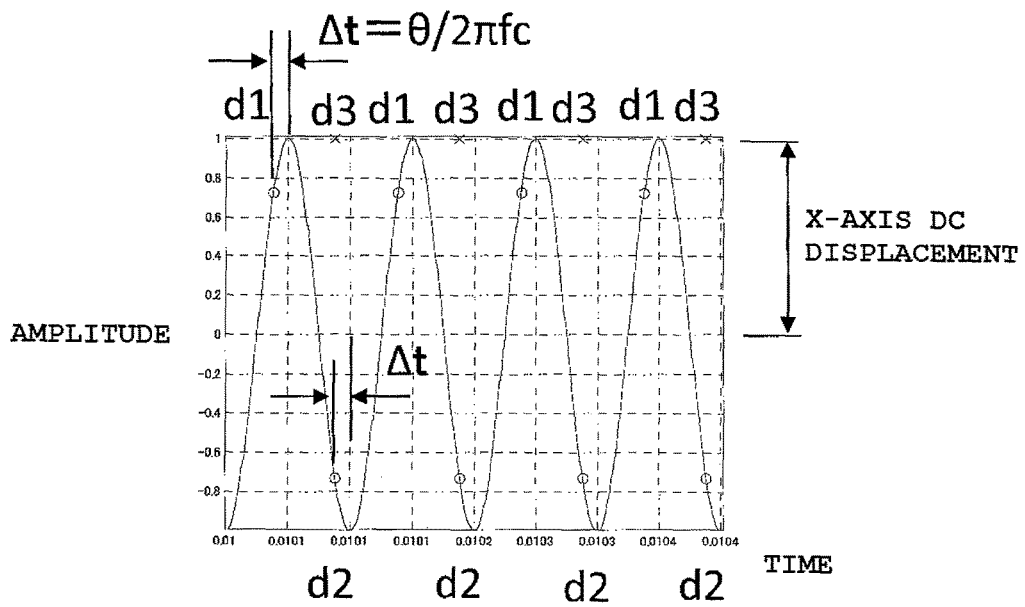
FIGS. 12A and 12B are diagrams respectively illustrating the differential signal Δixs and the differential signal Δiys when there is no interference of an adjacent axis.
Figure 12B:
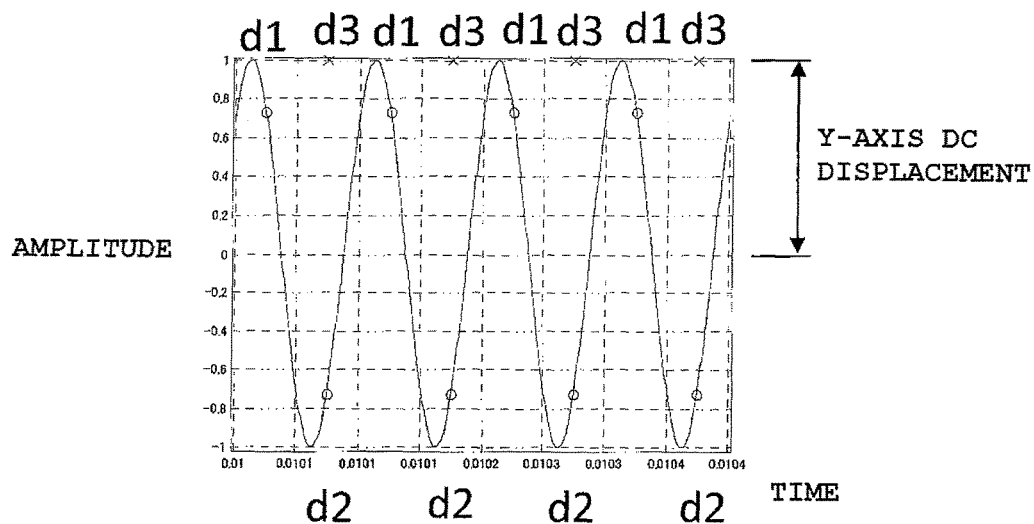

FIG. 12A is a diagram illustrating the differential signal Δixs (=2Bsdxs×sin(ωcxt−π/2)) when there is no interference of an adjacent axis (α=0, θ=45°). Similarly, FIG. 12B is a diagram illustrating the differential signal Δiys (=2Bsdys×sin(ωcxt+θ)) when there is no interference of an adjacent axis (α=0, θ=45°). In the case of the differential signal Δixs, the sampling timing indicated by white circles of each of the data d1 and the data d2 is shifted by time Δt=θ/2πfc corresponding to the phase θ toward the minus direction from each of the maximum and the minimum peaks of the line indicating the first term of Δixs. On the other hand, in the case of the differential signal Δiys, the sampling timing of each of the data d1 and the data d2 is shifted by time Δt=θ/2πfc corresponding to the phase θ toward the plus direction from each of the maximum and minimum peaks of the line indicating the first term of Δiys. Since the sampling timing is shifted from each of the maximum and minimum peaks in this manner, a value to be obtained is slightly smaller than the X-axis DC displacement.

Figure 13:
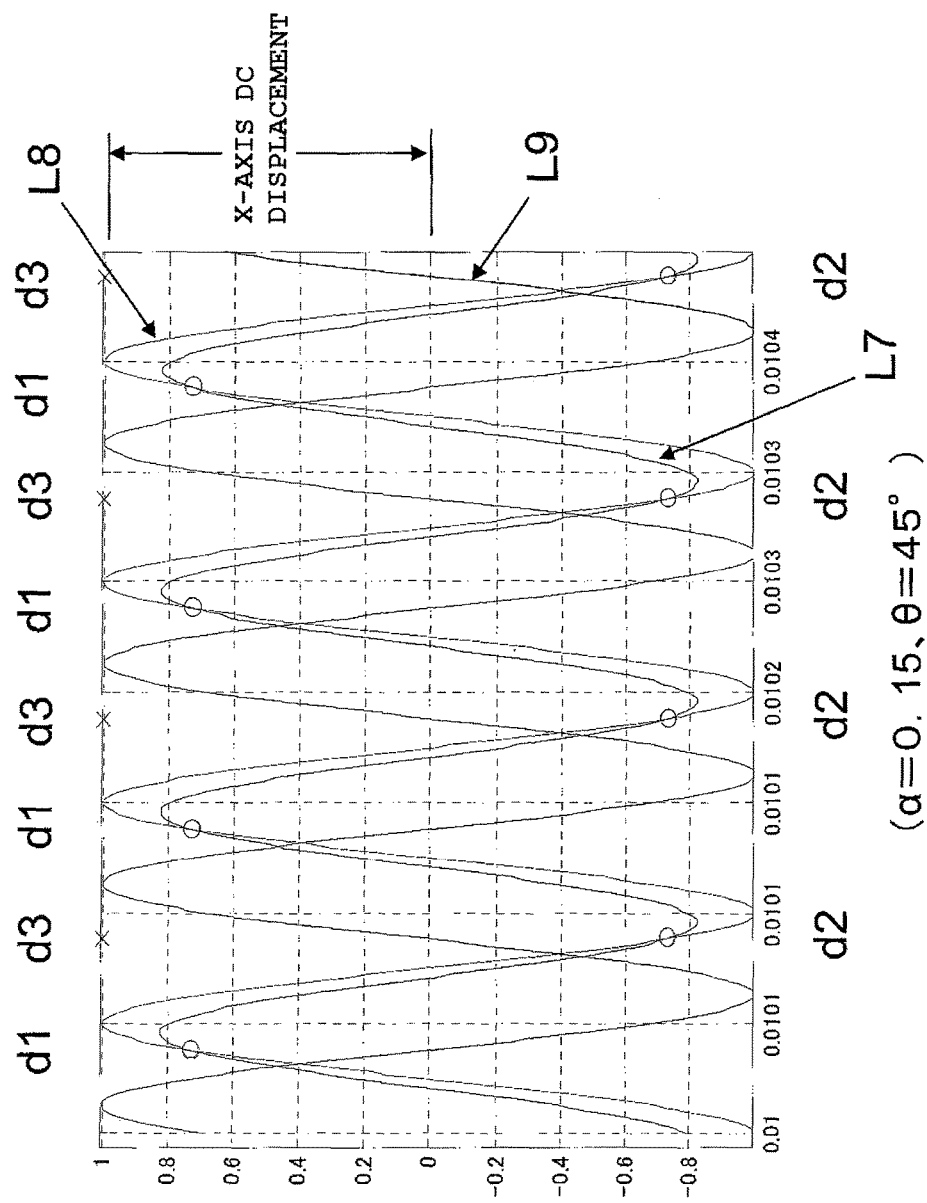
FIG. 13 is a diagram illustrating the differential signal Δixs when there is interference of an adjacent axis.
Figure 14:
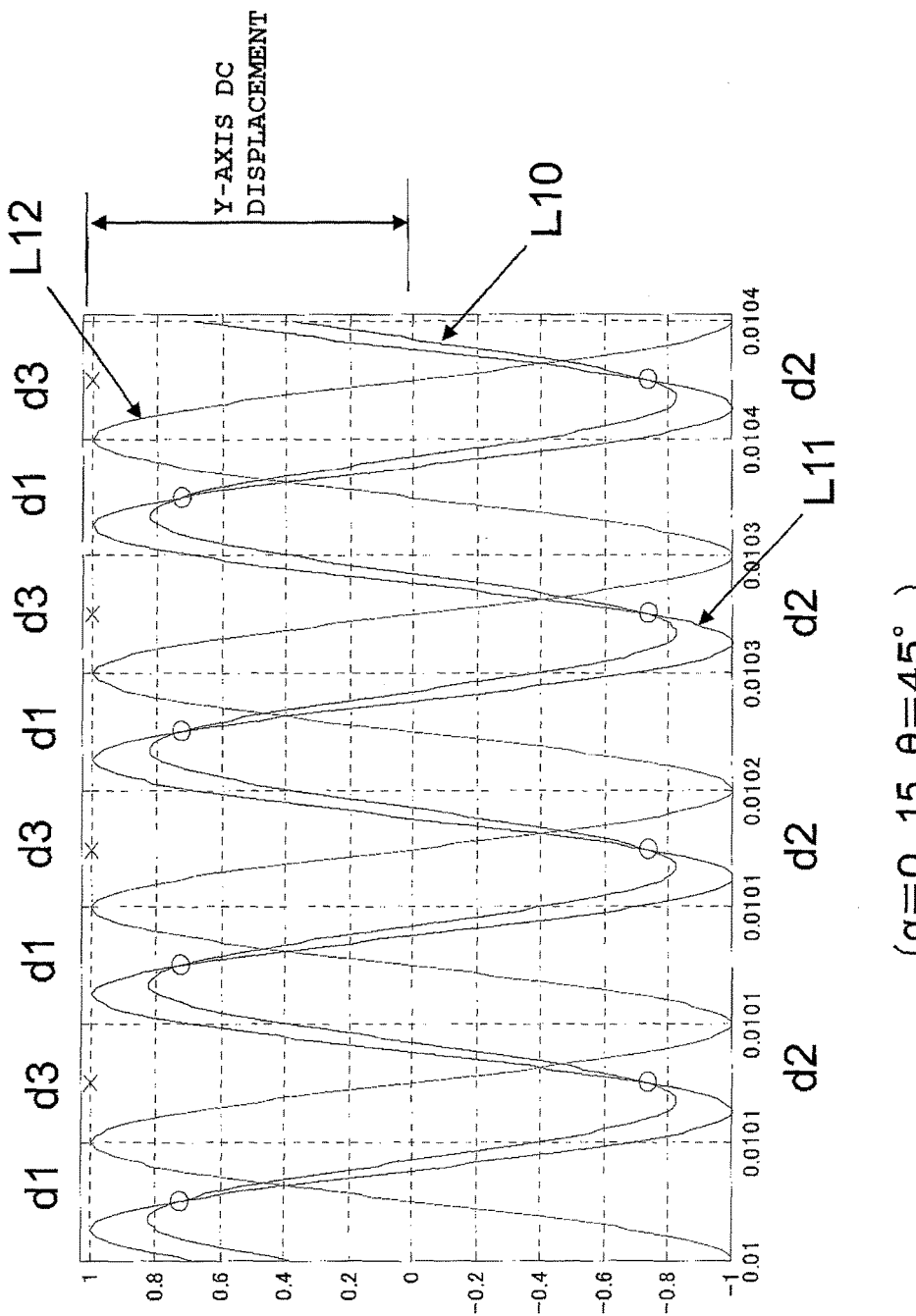
FIG. 14 is a diagram illustrating the differential signal Δiys when there is interference of an adjacent axis.

FIGS. 13 and 14 are diagrams illustrating the differential signal Δixs, the differential signal Δiys, the sampling timing of each of the data d1 and the data d2, and the output timing of the data d3 when α=0.15 and θ=45°. In FIG. 13, a line L7 indicates the differential signal Δixs, a line L8 indicates the first term of Expression (12), and a line L9 indicates the second term of Expression (12) (excepting α). The sampling timing indicated by white circles of each of the data d1 and the data d2 is shifted by the phase θ toward the advance side (+θ) from each of the maximum and minimum peaks of the line L7 which corresponds to the X-axis sensor carrier signal. At such sampling timing, the second term of Expression (12), that is, the noise component caused by the Y-axis interference becomes zero.

In FIG. 14, a line L10 indicates the differential signal Δiys, a line L11 indicates the first term of Expression (13), and a line L12 indicates the second term of Expression (13) (excepting α). The sampling timing indicated by white circles of each of the data d1 and the data d2 is shifted by the phase θ toward the delay side (−θ) from each of the maximum and minimum peaks of the line L11 which corresponds to the Y-axis sensor carrier signal. At such sampling timing, the second term of Expression (13), that is, the noise component caused by the X-axis interference becomes zero.

In the five-axis control type magnetic bearing as illustrated in FIG. 3, a displacement sensor is provided in each of the X1 axis, the Y1 axis, the X2 axis, the Y2 axis, and the Z axis. When AD converting sensor output signals by the single AD converter 34, these sensor output signals are input to respective input ch1 to ch5 to be sequentially taken in. Therefore, time shift occurs in the taking-in timing. As a result, when the phases of the five sensor carrier signals are aligned, the data d1 and the data d2 cannot be taken in at the maximum and minimum peaks of each of the sensor carrier signals. Therefore, by shifting the phases of the sensor carrier signals using the phase shift filters 37A to 37D, it is possible to take in the data d1 and the data d2 at the maximum and minimum peaks of each of the sensor carrier signals.

More specifically, the phase shift amounts θ of the respective phase shift filters 37A to 37D are set to θa, θb, θc, and θd so as not to overlap each other. In this case, the phase shift θ1=θa of the sensor carrier signal of the Y1-axis sensor 71y relative to the sensor carrier signal of the X1-axis sensor 71x and the phase shift θ2=θc−θb of the sensor carrier signal of the Y2-axis sensor 72y relative to the sensor carrier signal of the X2-axis sensor 72x are set within the range of −45° to 45°. By setting the phase of each of the sensor carrier signals in this manner, the above configuration can be applied between the X1-axis sensor 71x and the Y1-axis sensor 71y and between the X2-axis sensor 72x and the Y2-axis sensor 72y.

In the above description regarding the removal of the second noise component, the removal of the first noise component is also performed by taking the difference between the data d1 at the maximum peak or the vicinity thereof and the data d2 at the minimum peak or the vicinity thereof. However, as illustrated in FIG. 6B, the second noise component can be removed also by performing demodulation using only the data d1 or the data d2. That is, the removal of the second noise can be performed independently from the removal of the first noise. On the other hand, the case where the AD converter that sequentially takes in signals is applied has been described in the above. However, when a different type of AD converter that takes in signals of ch1 to ch5 in a lump at the same timing is applied, a carrier phase difference between adjacent X and Y axes may be set to 90°, namely, θ=0°.

—Second Embodiment—

In the above first embodiment, the magnetic bearing type turbo-molecular pump provided with the displacement sensor type magnetic bearing device has been described. In the second embodiment, a magnetic bearing type turbo-molecular pump that is provided with a magnetic bearing device having a position sensing function in addition to an original shaft supporting function will be described. In the following description, a self-sensing type magnetic bearing device having a position sensing function will be called a sensorless type magnetic bearing device. Hereinbelow, a case where the noise removal method described in the first embodiment is applied to the sensorless type magnetic bearing device will be described. Further, in a magnetic bearing type turbo-molecular pump provided with the sensorless type magnetic bearing device, the radial sensors 71 and 72, and the axial sensor 73 illustrated in FIG. 1 are omitted.

Figure 15:
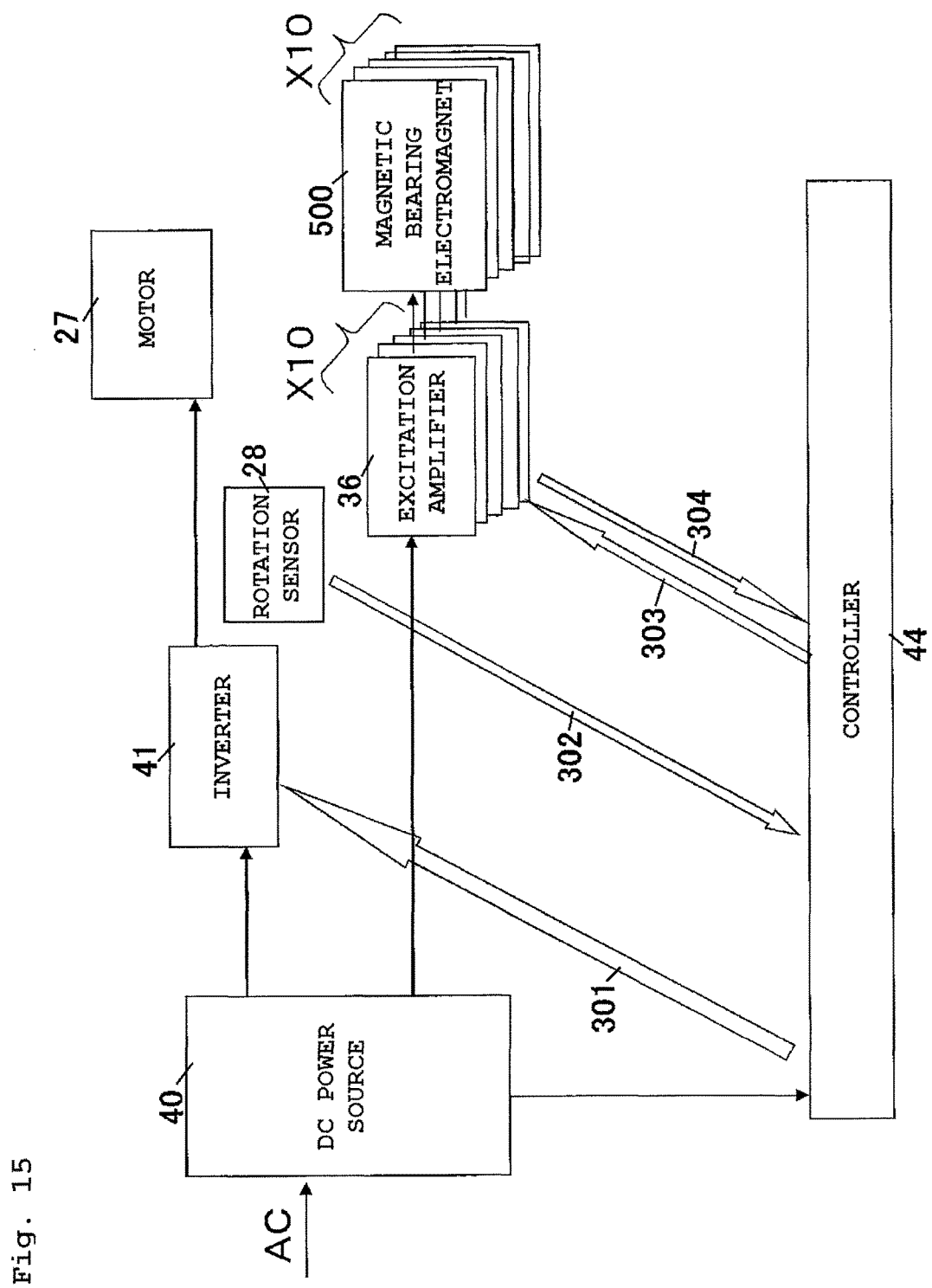
FIG. 15 is a block diagram illustrating the schematic configuration of a control unit of a sensorless magnetic bearing type turbo-molecular pump.

FIG. 15 is a block diagram illustrating the schematic configuration of a control unit of the sensorless magnetic bearing type turbo-molecular pump, and corresponds to FIG. 2 of the first embodiment. In the magnetic bearing type turbo-molecular pump provided with the sensorless type magnetic bearing device, a sensor circuit for a displacement sensor is omitted, and, instead, an electromagnet current on which a current component for sensing is superimposed is supplied to each magnetic bearing electromagnet 500.

Figure 16:
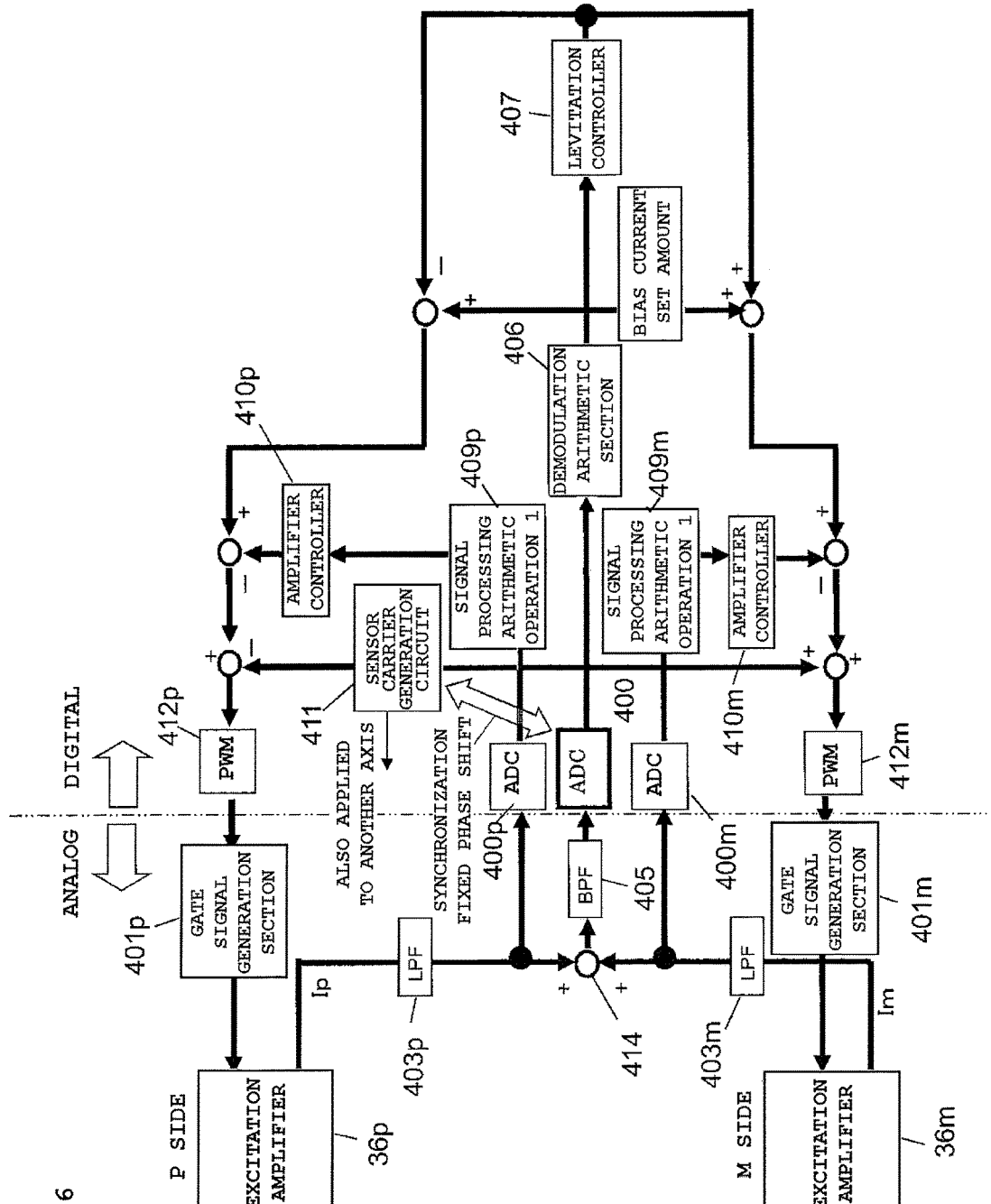
FIG. 16 is a functional block diagram of magnetic bearing control in a controller 44.

FIG. 16 is a functional block diagram of magnetic bearing control in a controller 44 regarding one axis in five control axes (X1 axis, for example). As described above, a pair of magnetic bearing electromagnets 500 (P side and M side) is provided for one control axis. Excitation amplifiers 36 (36p and 36m) are provided for the respective magnetic bearing electromagnets 500.

Figure 17:
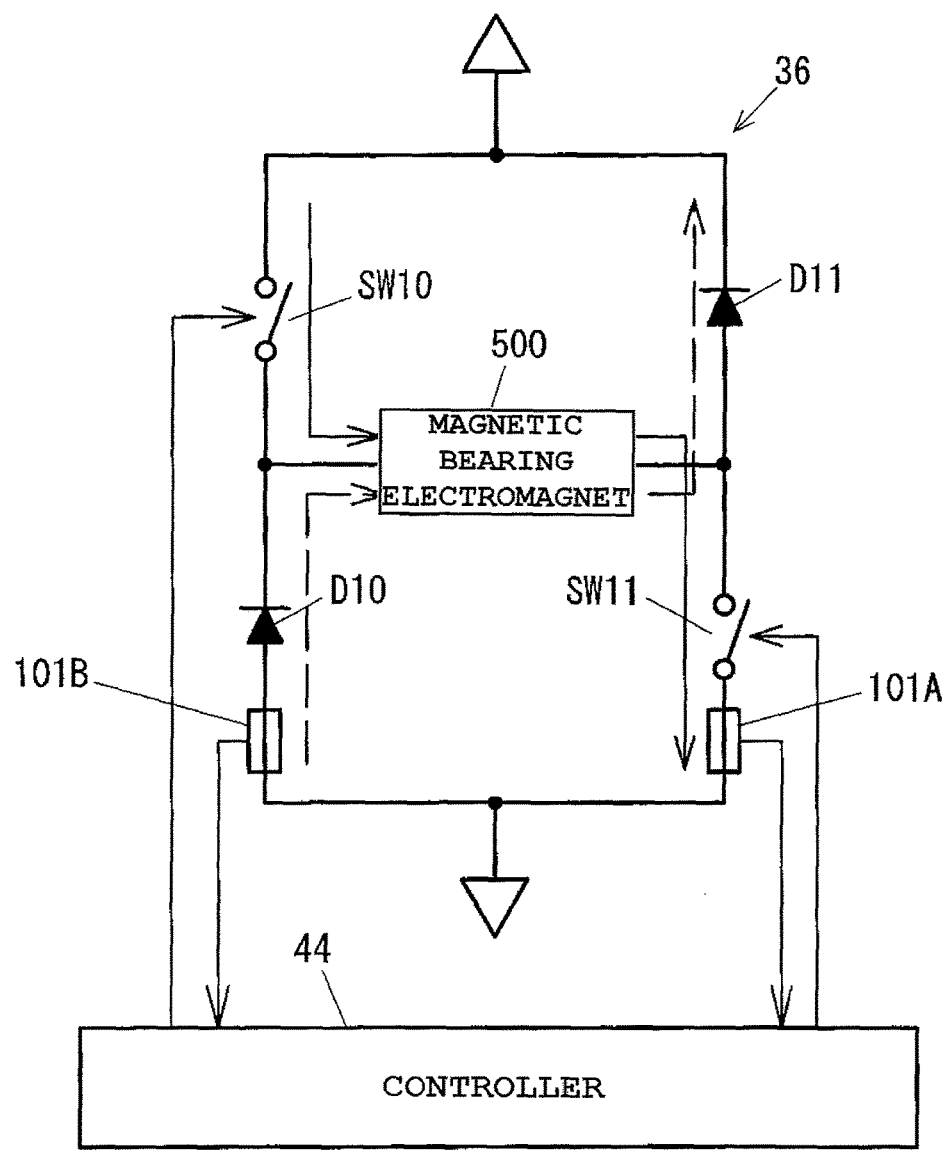
FIG. 17 is a diagram illustrating the configuration of an excitation amplifier 36.

FIG. 17 is a diagram illustrating the configuration of the excitation amplifier 36 which is provided corresponding to each of the magnetic bearing electromagnets 500. The excitation amplifier 36 is formed by connecting in parallel two serial connections in each of which a switching element and a diode are connected in series. The magnetic bearing electromagnet 500 is connected between an intermediate position between a switching element SW10 and a diode D10 and an intermediate position between a switching element SW11 and a diode D11.

The switching elements SW10 and SW11 are ON/OFF (conduction/cut-off) controlled on the basis of a PWM gate drive signal 303 from the controller 44. The switching elements SW10 and SW11 are turned ON/OFF at the same time. When both of the switching elements SW10 and SW11 are in an ON state, an electromagnet current flows as indicated by solid line arrows. On the other hand, when both of the switching elements SW10 and SW11 are in an OFF state, an electromagnet current flows as indicated by broken line arrows. A current value in an ON state is measured by a current sensor 101A, and a current value in an OFF state is measured by a current sensor 101B. For example, a shunt resistor is used in each of the current sensors 101A and 101B, and voltage of the shunt resistor is used as a current detection signal.

Referring back to FIG. 16, a gate signal generation section 401p generates a gate drive voltage (gate signal) for driving the switching element of a P-side excitation amplifier 36p on the basis of a PWM control signal generated in a PWM arithmetic section 412p. Similarly, a gate signal generation section 401m generates a gate signal for driving the switching element of an M-side excitation amplifier 36m on the basis of a PWM control signal generated in a PWM arithmetic section 412m.

When the switching element of each of the excitation amplifiers 36 (36p and 36m) is ON/OFF controlled on the basis of the gate signal, voltage is applied to an electromagnet coil of the magnetic bearing electromagnet 500, so that current Ip and current Im flow. A current detection signal (denoted by Ip in the same manner as the current) of the current Ip flowing in the P-side magnetic bearing electromagnet 500 is output from the current sensors 101A and 101B of the P-side excitation amplifier 36p. On the other hand, a current detection signal (denoted by Im in the same manner as the current) of the current Im flowing in the M-side magnetic bearing electromagnet 500 is output from the current sensors 101A and 101B of the M-side excitation amplifier 36m.

The electromagnet current flowing in each of the magnetic bearing electromagnets 500 includes, when functionally divided into components, a bias current ib, a levitation control current ic, and a sensor carrier component current is for position detection (a P-side current isp, an M-side current ism). Due to the necessity of magnetic levitation control and the necessity of satisfactorily detecting a position signal (displacement signal), in the components of the electromagnet current flowing in each of the magnetic bearing electromagnets 500 that face each other, the bias currents have the same sign, the levitation control currents have opposite signs, and the sensor carrier components have opposite signs. Therefore, the current Ip and the current Im are represented as following Expression (14). In Expression (14), since the amplitude of isp and the amplitude of ism have opposite signs, a coefficient of each of isp and ism is plus.

$$Ip = ib + ic + isp$$

$$Im = ib - ic + ism \qquad \text{[Expression (14)]}$$

The bias current ib is DC or in an extremely low frequency band, and used for bias for a balancing force with gravity acting on the rotor, improvement in the linearity of a levitation force, and displacement sensing.

The levitation control current ic is used for a control force which levitates a rotor shaft 4 to a predetermined position. Since the levitation control current ic changes depending on changes in the levitated position, the frequency band thereof is in the order of 1 kHz from DC.

The sensor carrier component is a current component that is used for detecting the levitated position displacement of the rotor shaft 4. In order to minimize the influence of the levitation control force, in the carrier component is, a frequency in a frequency band of several kHz to several tens of kHz (1 kHz<<fc<<100 kHz) is generally used.

Generally, in a magnetic bearing for industrial use, a PWM amplifier which controls voltage on the basis of the amount of deviation between a fed-back current signal and a target current value is used as the excitation amplifier 36 (36p, 36m). That is, the electromagnet current is controlled by controlling voltage applied to the electromagnet coil of the magnetic bearing electromagnet 500. Therefore, upon determining the signs of the bias current, the levitation control current, and the sensor carrier component, a sign relationship is generated by a voltage control signal before the application of voltage.

Sensor carrier components vsp and vsm in voltages Vp and Vm applied to the electromagnet coils are applied in opposite phases to each other. Therefore, the sensor carrier components vsp and vsm are represented as following Expression (15). In Expression (15), ωc=2πfc, and fc denotes a sensor carrier frequency. Further, t denotes time, and v denotes a constant amplitude value.

$$vsp=-v\times\sin(\omega c\times t)$$

$$vsm=v\times\sin(\omega c\times t) \quad \text{[Expression (15)]}$$

When a gap between the rotor shaft 4 and the magnetic bearing electromagnet 500 is large, an inductance value of the electromagnet coil becomes small. On the other hand, when the gap is small, the inductance value becomes large. Therefore, in electromagnet coils that face each other, as the inductance value of one of the facing electromagnet coils becomes larger, the inductance value of the other one of the facing electromagnet coils becomes smaller. That is, changes in the gap, namely, displacement information of the rotor shaft 4 can be obtained from changes in the inductance of each of the facing electromagnet coils.

In an inductance Lp of a P-side electromagnet coil and an inductance Lm of a M-side electromagnet coil, the P-side electromagnet coil and the M-side electromagnet coil facing each other, Expression (16) which is the same as that in the displacement sensor of the first embodiment holds. In Expression (16), D denotes a gap when the rotor shaft 4 is located at the levitation center axis (levitation target position), and d denotes displacement from the levitation target position.

Further, A is a constant.

$$1/Lp=A\times(D-d)$$

$$1/Lm=A\times(D+d) \quad \text{[Expression (16)]}$$

When the coil resistance is approximately ignored, the relationship between a voltage applied to the electromagnet coil and a current flowing in the electromagnet coil regarding the sensor carrier component can be represented by following Expression (17).

$$vsp=Lp\times d(isp)/dt$$

$$vsm=Lm\times d(ism)/dt \quad \text{[Expression (17)]}$$

The sensor carrier components isp and ism of current flowing in the electromagnet coils are represented as following Expression (18) from Formulae (15), (16), and (17). In Expression (18), B=v×A/ωc. In this manner, the sensor carrier components isp and ism are amplitude-modulated on the basis of changes with time of the displacement d. Therefore, the displacement information can be obtained by detecting the sensor carrier components isp and ism.

$$isp = -v\times\sin(\omega c\times t - \pi/2)/(\omega c\times Lp) \quad \text{[Expression (18)]}$$
$$= -B(D-d)\times\sin(\omega c\times t - \pi/2)$$

-continued
$$ism = v\times\sin(\omega c\times t - \pi/2)/(\omega c\times Lm)$$
$$= B(D+d)\times\sin(\omega c\times t - \pi/2)$$

The total current Ip and the total current Im respectively flowing in the P-side magnetic bearing electromagnet 500 and the M-side magnetic bearing electromagnet 500 are represented as following Expression (19).

$$Ip=ib+ic-B(D-d)\times\sin(\omega c\times t-\pi/2)$$

$$Im=ib-ic+B(D+d)\times\sin(\omega c\times t-\pi/2) \quad \text{[Expression (19)]}$$

As illustrated in FIG. 15, the current signal Ip detected in the excitation amplifier 36p is taken in by an AD converter 400p through a low pass filter 403p, and the current signal Im detected in the excitation amplifier 36m is taken in by an AD converter 400m through a low pass filter 403m. Further, the current signal Ip passed through the low pass filter 403p and the current signal Im passed through the low pass filter 403m are added to each other by an addition section 414, and a sum signal (Ip+Im) is output from the addition section 414. Then, the sum signal (Ip+Im) is input to an AD converter 400 through a band pass filter 405 having a sensor carrier frequency fc as the center frequency, and taken in by the AD converter 400.

(Removal of First Noise Component)

The AD converter 400 takes in data by synchronous sampling on the basis of a sensor carrier signal (sensor carrier component) generated in a sensor carrier generation circuit 411. Then, in the same manner as in the first embodiment, the sampling is performed at the maximum peak position and the minimum peak position (or the vicinity of the maximum peak position and the vicinity of the minimum peak position) with a sampling frequency fs that satisfies fc=(n+½) fs with respect to the frequency fc of the sensor carrier signal.

The sum signal (Ip+Im) taken in by the AD converter 400 is input to a demodulation arithmetic section 406. Then, in the demodulation arithmetic section 406, a demodulation arithmetic output d3=(d1−d2)/2 is calculated on the basis of a data value d1 at the maximum peak position and a data value d2 at the minimum peak position taken in by the sampling. In a magnetic levitation controller 407, proportional control, integral control, and differential control are generated on the basis of displacement information from the demodulation arithmetic section 406, and levitation control current setting is generated by phase correction or the like. Further, a result obtained by subtracting the levitation control current setting from the bias current set amount is used as control at the P side, and a result obtained by adding the levitation control current setting to the bias current set amount is used as control at the M side.

On the other hand, the current detection signal Ip taken in by the AD converter 400p and the current detection signal Im taken in by the AD converter 400m are respectively input to the signal processing arithmetic section 409p and the signal processing arithmetic section 409m. Each of the signal processing arithmetic sections 409p and 409m calculates information about current components (bias current ib and levitation control current ic) distributed to a levitation control force on the basis of the sampling data. For example, the signals are taken in by the AD converters 400p and 400m with fs=fc, and the taken-in signal data is subjected to moving average processing with the frequency fs in the signal processing arithmetic sections 409p and 409m.

The arithmetic result in the signal processing arithmetic section 409*p* is allowed to pass through an amplifier controller 410*p*, and then subjected to subtraction processing with respect to the result obtained by subtracting the levitation control current setting from the bias current set amount. Further, a sensor carrier component (v×sin(ωcxt)) from the sensor carrier generation circuit 411 is subtracted from the result of the subtraction processing, and a PWM control signal is generated on the basis of the subtraction result in a PWM arithmetic section 412*p*. The gate signal generation section 401*p* generates a gate drive voltage (PWM gate signal) on the basis of the PWM control signal generated in the PWM arithmetic section 412*p*.

Further, the arithmetic result in the signal processing arithmetic section 409*m* is allowed to pass through an amplifier controller 410*m*, and then subjected to subtraction processing with respect the result obtained by adding the levitation control current setting to the bias current set amount. Further, a sensor carrier component (v×sin(ωcxt)) from the sensor carrier generation circuit 411 is added to the result of the subtraction processing, and a PWM control signal is generated on the basis of the addition result in a PWM arithmetic section 412*m*. The gate signal generation section 401*m* generates a gate drive voltage on the basis of the PWM control signal generated in the PWM arithmetic section 412*m*.

There is characteristic variation between magnetic bearing electromagnets 500 that face each other in each of the axes, and there is interference of magnetic flux between axes that are perpendicular to each other (the Y1 axis with respect to the X1 axis, for example). Therefore, the levitation control current ic never becomes completely the same. In particular, it would appear that the disagreement in the levitation control current ic becomes larger as the frequency becomes higher. In view of the above, when a levitation control current at the P side is denoted by icp and a levitation control current at the M side is denoted by icm, Expression (19) is represented as following Expression (20).

$$Ip=ib+icp-B(D-d)\times\sin(\omega cxt-\pi/2)$$

$$Im=ib-icm+B(D+d)\times\sin(\omega cxt-\pi/2) \quad [\text{Expression (20)}]$$

The sum signal (Ip+Im) obtained by the addition of the current signals Ip and Im can be represented by following Expression (21). In Expression (21), Δicpm=icp−icm.

$$Ip+Im=2\times ib+\Delta icpm+2\times B\times d\times\sin(\omega cxt-\pi/2) \quad [\text{Expression (21)}]$$

As described above, the sum signal (Ip+Im) is input through the band pass filter 405 having the sensor carrier frequency fc as the center frequency. However, when taking the influence of signal delay caused by the filter into consideration, band-narrowing in the band pass filter 405 has a limit. Therefore, even when the sum signal (Ip+Im) is allowed to pass through the band pass filter 405, noise caused by a superimposed control current component remains in the input signal of the AD converter 400.

Therefore, the AD converter 400 has the same configuration as the AD converter 34 in the first embodiment, and performs the same sampling processing as the processing illustrated in FIGS. 6A to 8B. Further, in the demodulation arithmetic section 406, the demodulation arithmetic output d3=(d1−d2)/2 is calculated on the basis of the data value d1 at the maximum peak position and the data value d2 at the minimum peak position taken in by the sampling.

The input signal of the AD converter 400 is obtained by allowing the signal (Ip+Im) represented by Expression (21) to pass through the band pass filter 405, and, ideally, the signal should be totally cut excepting a demodulation signal. However, as described above, sufficient filtering cannot be performed due to trade-off with the prevention of signal delay which is essential in controlling the levitation. Therefore, in this specification, the signal represented by Expression (21) is regarded as the input signal of the AD converter 400 for convenience sake.

In Expression (21), the bias current ib can be regarded as constant current (DC). In the magnetic bearing type turbomolecular pump, the levitation control current ic is generally a signal obtained by subjecting a displacement signal to PID operation. Therefore, the frequency band of Δicpm is a wide band from DC to approximately 2 kHz that is involved in control responsiveness. Further, although the rotor displacement (displacement of the rotor shaft 4) depends on the size of the rotor, in a general magnetic bearing type turbomolecular pump, the frequency band of the rotor displacement is generally from DC to approximately 1 kHz which is equal to or narrower than the band of the levitation control signal ic. In comparison with these frequencies, the sensor carrier frequency fc is approximately 10 kHz, and therefore high. Therefore, each of the frequency of the levitation control current ic and the frequency of the displacement d is approximately ¹⁄₁₀ of the sensor carrier frequency fc, and therefore low. Accordingly, the levitation control current ic and the displacement change slower than the change of the sensor carrier signal.

On the other hand, the sampling frequency fs when taking in the signal into the AD converter 400 is sufficiently higher than the frequency of each of the levitation current ic and the displacement d. Therefore, in adjacent sampling timings, the amount of change in values of the displacement d and Δicpm is small, and the bias current ib is constant. Therefore, the data value d1 at the maximum peak position and the data value d2 at the minimum peak position can be represented as following Expression (22). As a result, when the demodulation arithmetic output d3=(d1−d2)/2 is calculated from the data value d1 and the data value d2 in the same manner as in the first embodiment, d3=d holds. Therefore, by using the demodulation arithmetic output d3, the levitation control current component can be cancelled including an AC component in addition to a DC component.

$$d1\approx ib+\Delta icpm+d$$

$$d2\approx ib+\Delta icpm-d \quad [\text{Expression (22)}]$$

(Removal of Second Noise Component)

Next, removal of a noise component caused by interference between adjacent axes will be described. Also in a sensorless type magnetic bearing device, as with the above radial sensor, a noise component caused by interference with an adjacent axis becomes a problem in an X-axis electromagnet current and a Y-axis electromagnet current. Here, an axis that receives the influence of interference is defined as the X axis (Xp side and Xm side coils) and an axis that applies the influence of interference is defined as the Y axis (Yp side and Ym side coils). Due to the symmetry, it is natural to consider that, both of the p-side and m-side coils in the X axis receive equal interference from both of the p-side and m-side coils in the Y axis. Accordingly, the influence of interference can be simply represented by adding the term obtained by multiplying an excitation current flowing in each of the coils by an interference degree α to Expression (20).

When Expression (20) is expressed as an X-side current Ixp and an X-side current Ixm, the current Ixp and the current Ixm are represented as following Expression (23).

An X-axis displacement signal is included in a signal (Ixp+Ixm) obtained by adding the X-axis currents to each other. The sum signal (Ixp+Ixm) is represented as following Expression (24). In Expression (24), Δicxpm=icxp−icxm.

$$Ixp = ibx + icxp - B(D-dx) \times \sin(\omega_c t - \pi/2) + \alpha(Iyp+Iym)$$

$$Ixm = ibx - icxm + B(D+dx) \times \sin(\omega_c t - \pi/2) + \alpha(Iyp+Iym) \quad [\text{Expression (23)}]$$

$$Ixp + Ixm = 2ibx + \Delta icxpm + 2Bdx \times \sin(\omega_c t - \pi/2) + 2\alpha(Iyp+Iym) \quad [\text{Expression (24)}]$$

The same is true in the Y axis, and following Expression (25) and Expression (26) respectively corresponding to Expression (23) and Expression (24) hold. Further, Δicypm=icyp−icym. Further, as with the first embodiment, ϕ denotes the phase shift between sensor carrier signals of the X and Y axes.

$$Iyp = iby + icyp - B(D-d) \times \sin(\omega_c t - \pi/2 + \phi) + \alpha(Ixp+Ixm)$$

$$Iym = iby - icym + B(D+d) \times \sin(\omega_c t - \pi/2 + \phi) + \alpha(Ixp+Ixm) \quad [\text{Expression (25)}]$$

$$Iyp + Iym = 2iby + \Delta icypm + 2Bdx \times \sin(\omega_c t - \pi/2 + \phi) + 2\alpha(Ixp+Ixm) \quad [\text{Expression (26)}]$$

When Expression (26) is substituted into Expression (24) and the term of $\alpha^2$ is ignored due to $\alpha \ll 1$, Expression (26) can be represented as following Expression (27).

$$Ixp + Ixm = \{2ibx + 2iby\} + \{\Delta icxpm + 2\alpha\Delta icypm\} + \{2B(dx \times \sin(\omega_c t - \pi/2) + 2\alpha dy \times \sin(\omega_c t - \pi/2 + \phi))\} \quad [\text{Expression (27)}]$$

The right side of Expression (27) includes a bias current term as the first term, a control current term as the second term, and a displacement-modulated wave term as the third term. Noise components of the first and second terms are removed by the method of removing the first noise component described above.

On the other hand, the third term corresponds to Expression (8) in the first embodiment. The second term containing α represents a noise component caused by interference between two adjacent axes, and a noise of 2αdy is added to the signal dx. As can be understood from the corresponding relationship between Expression (8) and the third term of Expression (27), the noise component can be removed in the same manner by applying the method of removing the second noise component described in the first embodiment. Description of the removal method will be omitted to prevent the repetition. In the same manner as in the first embodiment, the phase shift ϕ between the X-axis side sensor carrier signal and the Y-axis side sensor carrier signal may be set to ϕ=90°+θ, and, upon performing sampling, the sampling of the data d1 and the data d2 may be performed with shifting the phase by θ from the maximum and minimum peaks of the sensor carrier signal in both of the X-axis side and the Y-axis side. Further, θ satisfies −45°≤θ≤45°. The sensor carrier signal as described above is output to each of the axes from the sensor carrier generation circuit 411 of FIG. 16. Further, the AD converter 400 samples the data d1 and the data d2 with shifting the phase by θ in synchronization with the sensor carrier signals from the sensor carrier generation circuit 411. As a result, the noise component caused by the influence of interference with the adjacent axis can also be removed. As also described in the first embodiment, even when either one of the data d1 or the data d2 is sampled, the second noise component can be removed.

Figure 18A:
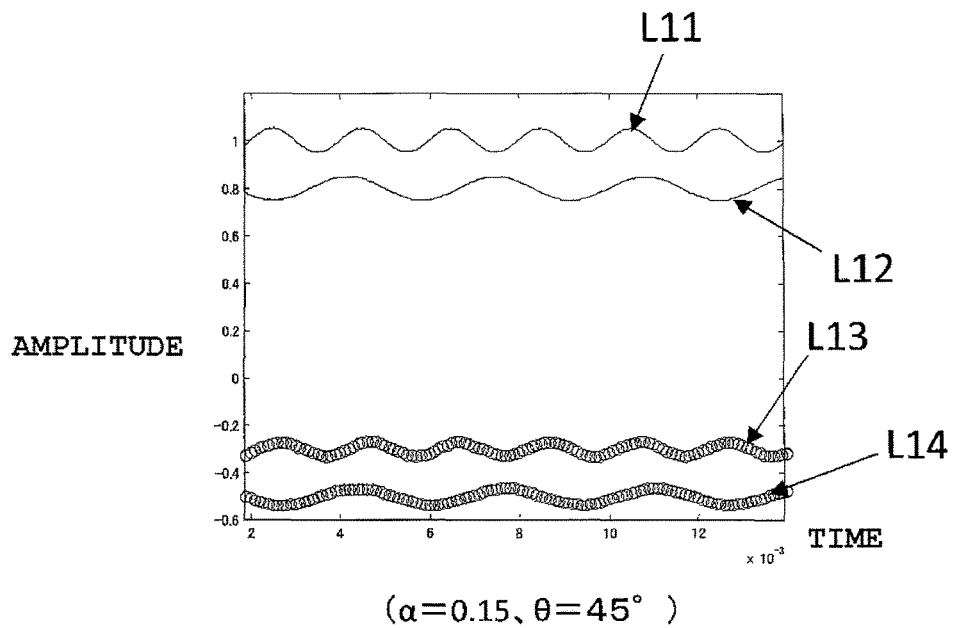
FIGS. 18A and 18B are diagrams illustrating X-axis displacement, Y-axis displacement, X-axis displacement demodulation output, and Y-axis displacement demodulation output in each of a case where a noise countermeasure is performed and a case where no noise countermeasure is performed.
Figure 18B:
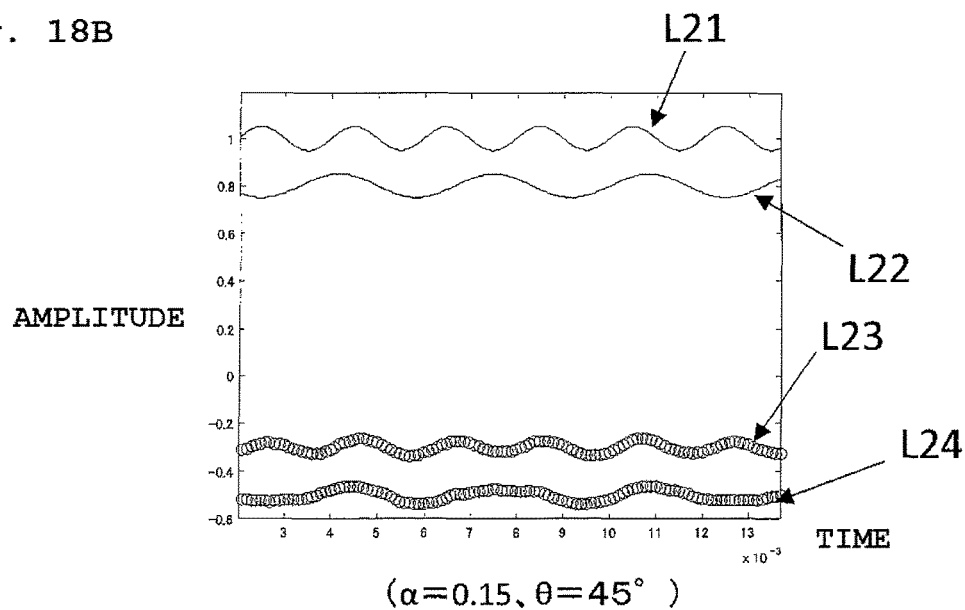

FIG. 18A is a diagram illustrating X-axis displacement (line L11), Y-axis displacement (line L12), X-axis displacement demodulation output (line L13), and Y-axis displacement demodulation (line L14) when a noise component caused by interference between the X and Y axes is removed. On the other hand, FIG. 18B is a diagram illustrating a case where a noise component caused by interference between the X and Y axes is not removed, that is, when the phase of the X-axis sensor carrier signal and the phase of the Y-axis sensor carrier signal are made equal to each other. Lines L21 to L24 respectively correspond to the lines L11 to L14 of FIG. 18A. Here, simply, the rotor shaft 4 vibrates in the X-axis direction only with 500 Hz, and in the Y-axis direction only with 300 Hz. Further, α=0.15, and θ=45°.

When comparing FIG. 18A with FIG. 18B, it can be confirmed that, there is much distortion in FIG. 18B in which no noise removal countermeasure is performed, and, on the other hand, there is less distortion in FIG. 18A in which a noise removal countermeasure is performed.

Figure 19:
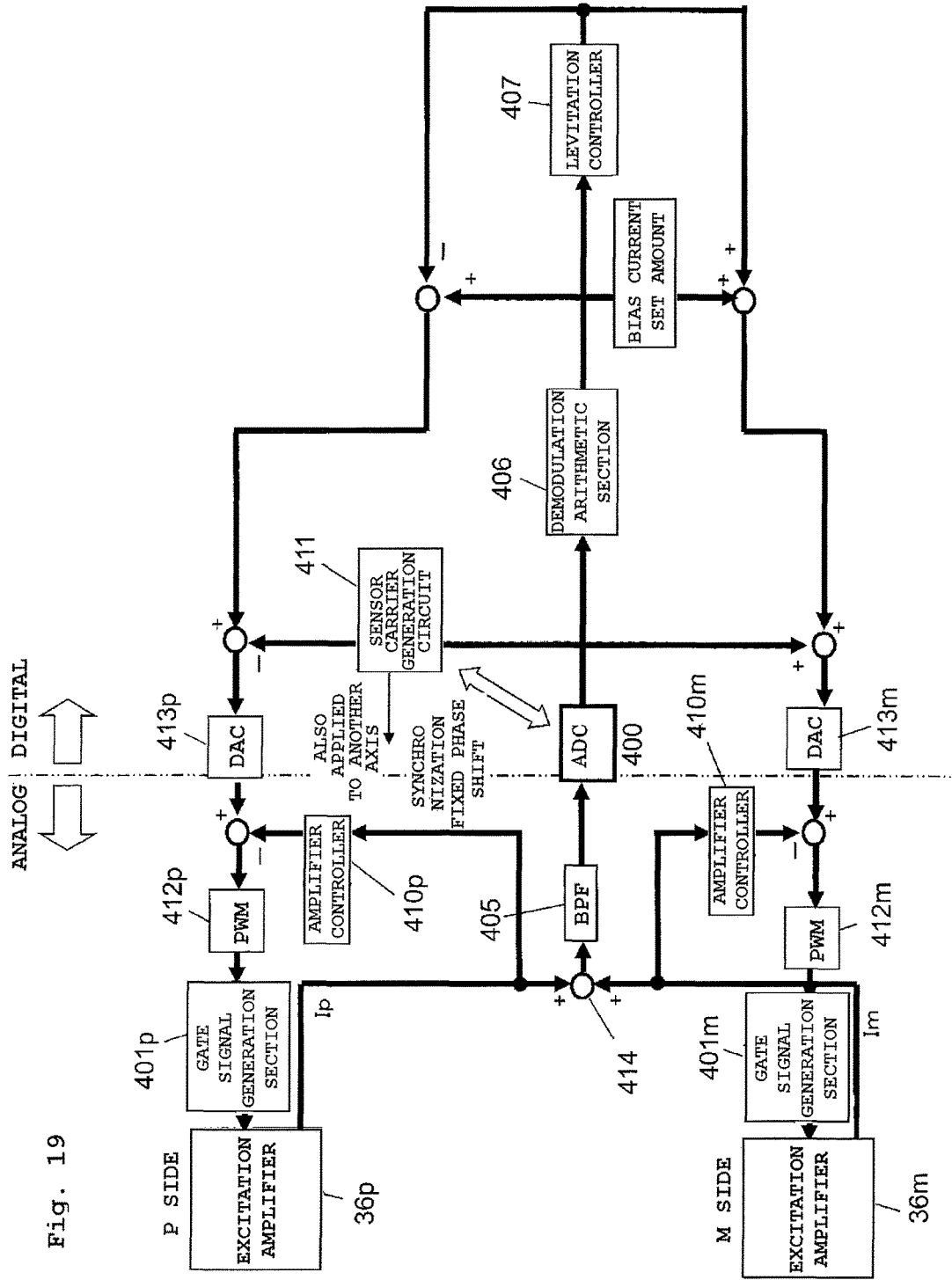
FIG. 19 is a diagram illustrating another configuration in the sensorless magnetic bearing type turbo-molecular pump.

In the example illustrated in FIG. 16, the processing up to the generation of a PWM control signal to the excitation amplifiers 36p and 36m is digitally processed. However, as illustrated in FIG. 19, a control current including a bias current on which a sensor carrier is superimposed may be output from DA converters 413p and 413m.

In the configuration of FIG. 16, since the processing up to the PWM control signal generation is digitally processed, PWM signal output to be a gate signal is a binary signal of H/L. Therefore, the output is not limited to conventional DA converter output, and is digitally output in many cases. In the description of FIG. 16, the current signals Ip and Im are taken in with fs=fc, and the taken-in signal data is subjected to the moving average processing with the frequency fs. However, a method of taking in the current signals Ip and Im is not limited thereto.

Although the sum signal (Ip+Im) is taken in by the AD converter 400 in the second embodiment, the present invention is not limited thereto. For example, the present invention can also be applied in the same manner to a configuration in which the signs of vsp and vsm represented by Expression (15) are modified to be the same sign (+v in both of them), and a differential signal (Ip−im) is taken in.

As described above, the phase of the second carrier signal applied to the sensor 71y of the Y1 axis of FIG. 3 is set to differ by (π/2+θ) radian from the phase of the first carrier signal applied to the sensor 71x of the X1 axis. In addition, the displacement-modulated wave signal (first modulated signal) output from the first sensor 71x is sampled at the sampling timing that is shifted by the phase θ from the timing at which the first carrier signal becomes its peak, and the second modulated signal output from the second sensor 71y is sampled at the sampling timing that is shifted by the phase (−θ) from the timing at which the second carrier signal becomes its peak. Further, in the sensorless type magnetic bearing device, detection signals of the current sensors 101A and 101B each of which detects the electromagnet current are sampled at the above sampling timings. As a result, it is possible to remove a noise component caused by interference of the adjacent axis, and improve the S/N ratio of the displacement information in the magnetic bearing control. Further, the generation of vibration due to the mixing of a noise component can be suppressed.

Further, the sampling is performed with a frequency fs1 that satisfies fc=(m+½)×fs1 (where, m is an integer equal to or larger than zero) with respect to the frequency fc of the first carrier signal to thereby output, as the demodulation result, a value d1=(d11−d12)/2 that is calculated from data d11 obtained by sampling the displacement-modulated wave signal (first modulated signal) at the timing that is shifted by the phase θ from the timing at which the first carrier signal becomes the maximum peak and data d12 obtained by sampling the first modulated signal at the timing that is shifted by the phase θ from the timing at which the first carrier signal is located near the minimum peak position. Similarly, the sampling is performed with a frequency fs2 that satisfies fc=(n+½)×fs2 (where, n is an integer equal to or larger than zero) with respect to the frequency fc of the second carrier signal to thereby output, as the demodulation result, a value d23=(d21−d22)/2 that is calculated from data d21 obtained by sampling the second modulated signal at the timing that is shifted by the phase (−θ) from the timing at which the second carrier signal becomes the minimum peak and data d22 obtained by sampling the second modulated signal at the timing that is shifted by the phase (−θ) from the timing at which the second carrier signal is located near the minimum peak position.

By performing such sampling and demodulation arithmetic operations, in addition to the removal of the noise component caused by interference of the adjacent axis described above, it is possible to prevent a vibration component (noise component) of the electromagnet current control from being mixed into the displacement information. As a result, the S/N ratio can be further improved, and the vibration caused by the noise component can be suppressed.

Further, by setting the phase shift θ within the range of $-\pi/4 \leq \theta \leq \pi/4$, even when signals of a plurality of axes are taken in by a single AD converter, a reduction in the S/N ratio can be minimized.

In the above embodiments, the turbo-molecular pump having the turbo pump stage and the drag pump stage has been described as an example. However, the present invention can be applied in the same manner to any vacuum pump as long as it supports a rotator by a magnetic bearing device.

The above description is merely an example, and the present invention is not limited at all to the above embodiments unless impairing the characteristics of the invention.

What is claimed is:

1. A magnetic bearing device comprising:
   a first radial electromagnet supporting a rotor shaft in a contactless manner in a first radial direction;
   a second radial electromagnet supporting the rotor shaft in a contactless manner in a second radial direction;
   a first excitation amplifier supplying a first electromagnet current on which a first carrier signal for detecting displacement of the position of the rotor shaft in the first radial direction is superimposed to the first radial electromagnet;
   a second excitation amplifier supplying a second electromagnet current on which a second carrier signal for detecting displacement of the position of the rotor shaft in the second radial direction is superimposed to the second radial electromagnet;
   a first current sensor detecting the first electromagnet current;
   a second current sensor detecting the second electromagnet current;
   a first demodulation section performing demodulation by sampling a detection signal of the first current sensor to extract rotor shaft position displacement information;
   a second demodulation section performing demodulation by sampling a detection signal of the second current sensor to extract rotor shaft position displacement information; and
   a controller controlling each of the first excitation amplifier and the second excitation amplifier based on a result of demodulation by each of the first demodulation section and the second demodulation section,
   wherein the phase of the second carrier signal differs by $\pi/2+\theta$ radian from the phase of the first carrier signal,
   wherein the first demodulation section samples the detection signal of the first current sensor at sampling timing shifted by a phase θ from timing at which the first carrier signal becomes a peak, and
   wherein the second demodulation section samples the detection signal of the second current sensor at sampling timing shifted by a phase −θ from timing at which the second carrier signal becomes a peak.

2. The magnetic bearing device according to claim 1, wherein the first demodulation section performs sampling with a frequency fs1 that satisfies fc=(m+½)×fs1, where m is an integer equal to or larger than zero, with respect to a frequency fc of the first carrier signal to output, as the demodulation result, a value d13=(d11−d12)/2 that is calculated from data d11 obtained by sampling the detection signal of the first current sensor at timing shifted by the phase θ from timing at which the first carrier signal becomes a maximum peak and data d12 obtained by sampling the detection signal of the first current sensor at timing shifted by the phase θ from timing at which the first carrier signal is located near a minimum peak position, and
wherein the second demodulation section performs sampling with a frequency fs2 that satisfies fc=(n+½)×fs2, where n is an integer equal to or larger than zero, with respect to a frequency fc of the second carrier signal to output, as the demodulation result, a value d23=(d21−d22)/2 that is calculated from data d21 obtained by sampling the detection signal of the second current sensor at timing shifted by the phase −θ from timing at which the second carrier signal becomes a maximum peak and data d22 obtained by sampling the detection signal of the second current sensor at timing shifted by the phase −θ from timing at which the second carrier signal is located near a minimum peak position.

3. The magnetic bearing device according to claim 1, wherein the phase θ is set within the range of $-\pi/4 \leq \theta \leq \pi/4$.

4. A vacuum pump comprising:
   a pump rotor;
   a motor driving the pump rotor to rotate; and
   the magnetic bearing device according to claim 1, the magnetic bearing device supporting the pump rotor by magnetic levitation.

* * * * *